(12) United States Patent
Kodaira et al.

(10) Patent No.: US 9,725,355 B2
(45) Date of Patent: Aug. 8, 2017

(54) LIQUID COMPOSITION AND ITS PRODUCTION PROCESS, AND GLASS ARTICLE

(71) Applicant: ASAHI GLASS COMPANY, LIMITED, Chiyoda-ku (JP)

(72) Inventors: Hirokazu Kodaira, Chiyoda-ku (JP); Yutaka Hayami, Chiyoda-ku (JP); Hiroyuki Tomonaga, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 838 days.

(21) Appl. No.: 14/035,339

(22) Filed: Sep. 24, 2013

(65) Prior Publication Data

US 2014/0023860 A1    Jan. 23, 2014

Related U.S. Application Data

(63) Continuation of application No. PCT/JP2012/057393, filed on Mar. 22, 2012.

(30) Foreign Application Priority Data

Mar. 24, 2011   (JP) .............................. 2011-066745

(51) Int. Cl.
| | | |
|---|---|---|
| *C03C 17/32* | (2006.01) | |
| *C03C 17/00* | (2006.01) | |
| *C09D 5/02* | (2006.01) | |
| *C09D 5/32* | (2006.01) | |
| *C09D 7/12* | (2006.01) | |
| *C08K 3/22* | (2006.01) | |
| *C08K 5/3475* | (2006.01) | |
| *C08K 5/3492* | (2006.01) | |
| *C08L 63/00* | (2006.01) | |

(52) U.S. Cl.
CPC .......... *C03C 17/326* (2013.01); *C03C 17/008* (2013.01); *C09D 5/027* (2013.01); *C09D 5/32* (2013.01); *C09D 7/1216* (2013.01); *C09D 7/1241* (2013.01); *C03C 2217/445* (2013.01); *C03C 2217/476* (2013.01); *C03C 2217/74* (2013.01); *C08K 3/22* (2013.01); *C08K 5/3475* (2013.01); *C08K 5/34926* (2013.01); *C08L 63/00* (2013.01); *Y10T 428/265* (2015.01)

(58) Field of Classification Search
CPC ....... C03C 17/326; C03C 17/008; C09D 5/02; C09D 5/327
See application file for complete search history.

(56) References Cited

U.S. PATENT DOCUMENTS

| 8,174,190 B2 | 5/2012 | Ota et al. |
|---|---|---|
| 2010/0220388 A1* | 9/2010 | Suzuki ................... B32B 17/10 |
| | | 359/359 |
| 2011/0248225 A1 | 10/2011 | Mamak et al. |
| 2012/0038976 A1 | 2/2012 | Kodaira et al. |
| 2013/0071669 A1 | 3/2013 | Kodaira et al. |
| 2014/0023860 A1 | 1/2014 | Kodaira et al. |

FOREIGN PATENT DOCUMENTS

| JP | 2001-89710 | 4/2001 |
|---|---|---|
| JP | 2006-143878 | 6/2006 |
| JP | 2007-106826 | 4/2007 |
| JP | 2008-101111 | 5/2008 |
| JP | 2008-101111 A | 5/2008 |
| JP | 2009-51981 | 3/2009 |
| JP | 2009-114326 A | 5/2009 |
| JP | 2010-272514 | 12/2010 |
| WO | WO 2007/040257 A1 | 4/2007 |
| WO | 2010/055845 | 5/2010 |
| WO | WO 2010/113901 A1 | 10/2010 |
| WO | 2010/140688 | 12/2010 |
| WO | WO 2010/143645 A1 | 12/2010 |
| WO | WO 2011/005631 A2 | 1/2011 |
| WO | 2012/128332 A1 | 3/2012 |

OTHER PUBLICATIONS

Office Action in JP patent application No. 2015-116096, issued on May 10, 2016.
International Search Report issued May 29, 2012 in PCT/JP2012/057393 filed Mar. 22, 2012.
Extended European Search Report issued Sep. 9, 2014 in Patent Application No. 12761157.2.
U.S. Appl. No. 14/659,945, filed Mar. 17, 2015, Kodaira, et al.
Office Action issued Apr. 7, 2015 in Japanese Patent Application No. 2013-506008.

* cited by examiner

*Primary Examiner* — Ling Choi
*Assistant Examiner* — Thuy-Ai N Nguyen
(74) *Attorney, Agent, or Firm* — Oblon, McClelland, Maier & Neustadt, L.L.P.

(57) ABSTRACT

To provide a liquid composition capable of forming a coating film which has sufficient ultraviolet-absorbing ability and infrared-absorbing ability.
A liquid composition for forming a coating film comprising an infrared absorber selected from indium tin oxide, antinomy tin oxide and a composite tungsten oxide, an ultraviolet absorber selected from a benzophenone compound, a triazine compound and a benzotriazole compound, a dispersing agent having an acid value and/or an amine value, a binder component and a liquid medium, wherein the dispersing agent is contained in a content such that the product of the sum (mgKOH/g) of the acid value and the amine value of the dispersing agent, and the mass ratio of the dispersing agent to the infrared absorber, is from 2 to 30 (mgKOH/g).

20 Claims, No Drawings

LIQUID COMPOSITION AND ITS PRODUCTION PROCESS, AND GLASS ARTICLE

TECHNICAL FIELD

The present invention relates to a liquid composition for forming an ultraviolet/infrared-absorbing film which shields both ultraviolet rays and infrared rays on the surface of an article such as glass, and a glass article having an ultraviolet/infrared absorbing film formed by using the liquid composition.

BACKGROUND ART

In recent years, it has been attempted to form on a transparent substrate such as window glass for a vehicle such as an automobile or window glass for a building material to be attached to a house or building, an ultraviolet-absorbing film which has an ability to absorb ultraviolet rays entering into the vehicle or room therethrough and which has mechanical durability such as abrasion resistance. On the other hand, it has also been attempted to form an infrared-absorbing film having an infrared-absorbing ability on a transparent substrate such as glass.

Further, a patent has been made regarding a coating fluid to form a coating film having both ultraviolet-absorbing ability and infrared-absorbing ability on a transparent substrate such as glass, and a substrate having such a coating film formed thereon (Patent Document 1).

Specifically, for the coating film as disclosed in Patent Document 1, a benzophenone or benzotriazole organic compound is used as the ultraviolet absorber, and inorganic fine particles of e.g. a composite tungsten oxide, antimony tin oxide or indium tin oxide are used as the infrared absorber, whereby a coating film having both ultraviolet-absorbing ability and infrared-absorbing ability can be obtained.

PRIOR ART DOCUMENT

Patent Document

Patent Document 1: JP-A-2008-101111

DISCLOSURE OF INVENTION

Technical Problem

The present inventors have found that if an ultraviolet absorber (a benzophenone or benzotriazole organic compound) and an infrared absorber (inorganic fine particles of e.g. a composite tungsten oxide, antimony tin oxide or indium tin oxide) are present in the same film, as in the coating film disclosed in Patent Document 1, the organic compound is bonded to the inorganic fine particles by a chelate bond, whereby there will be absorption in the visible light region, and the film tends to be yellowish even when the film is required to be colorless and transparent, and there are problems in view of the weather resistance.

The present invention has been made to solve the above problems, and its object is to provide a liquid composition capable of forming a coating film sufficiently having an ultraviolet-absorbing ability and an infrared-absorbing ability, being securely colorless and transparent, and also being excellent in the weather resistance, and its production process, and a glass article comprising a coating film sufficiently having an ultraviolet-absorbing ability and an infrared-absorbing ability, being securely colorless and transparent, and also being excellent in the weather resistance.

Solution to Problem

The present invention provides a liquid composition according to the following [1] to [11], a glass article according to [12] and [13], and a process for producing a liquid composition according to [14] and [15].

[1] A liquid composition for forming a coating film, which comprises an infrared absorber (a) containing at least one member selected from indium tin oxide, antimony tin oxide and a composite tungsten oxide, an ultraviolet absorber (b) containing at least one member selected from a benzophenone compound, a triazine compound and a benzotriazole compound, a dispersing agent (c), a binder component (d) and a liquid medium (f); wherein (I) the dispersing agent (c) is a dispersing agent having an acid value and/or an amine value, and the dispersing agent (c) is contained in such an amount that the product of the sum (mgKOH/g) of the acid value and the amine value, and the mass ratio of the dispersing agent (c) to the infrared absorber (a), is from 2 to 30 (mgKOH/g);

(II) the dispersing agent (c) is a dispersing agent having an acid value of from 5 to 200 mgKOH/g, and the dispersing agent is contained in a proportion of from 11 to 40 parts by mass per 100 parts by mass of the infrared absorber (a); or (III) the liquid composition further contains a chelating agent (e) capable of forming a complex with the infrared absorber (a), the formed complex not substantially absorbing light having a visible light wavelength; the dispersing agent (c) is contained in a proportion of from 0.1 to 40 parts by mass per 100 parts by mass of the infrared absorber (a) and in such an amount that the product of the sum (mgKOH/g) of the acid value and the amine value of the dispersing agent (c), and the mass ratio of the dispersing agent (c) to the infrared absorber (a), is from 0 to 30 (mgKOH/g); and the chelating agent (e) is contained in a proportion of from 2 to 50 parts by mass per 100 parts by mass of the infrared absorber (a).

[2] The liquid composition according to [1], wherein in the case of (I), the dispersing agent (c) is a dispersing agent having an acid value of from 40 to 200 mgKOH/g and an amine value of from 0 to 10 mgKOH/g, a dispersing agent having an acid value of from 0 to 10 mgKOH/g and an amine value of from 40 to 200 mgKOH/g, or a dispersing agent having an acid value of from 5 to 30 mgKOH/g and an amine value of from 5 to 30 mgKOH/g.

[3] The liquid composition according to [1] or [2], wherein in the case of (I) or (II), the liquid composition further contains a chelating agent (e) capable of forming a complex with the infrared absorber (a), the formed complex not substantially absorbing light having a visible light wavelength.

[4] The liquid composition according to [3], wherein the chelating agent (e) is contained in a proportion of from 2 to 50 parts by mass per 100 parts by mass of the infrared absorber (a).

[5] The liquid composition according to any one of [1] to [4], wherein the chelating agent (e) is at least one member selected from the group consisting of an aminocarboxylic acid chelating agent, a phosphonic acid chelating agent and a chelate metal salt.

[6] The liquid composition according to any one of [1] to [5], wherein the infrared absorber (a) is contained in a proportion of from 1 to 80 parts by mass, and the ultraviolet absorber (b) is contained in a proportion of from 1 to 50 parts by mass, per 100 parts by mass of the binder component (d).

[7] The liquid composition according to any one of [1] to [6], wherein the ultraviolet absorber (b) is a hydroxy group-containing benzophenone compound.

[8] The liquid composition according to any one of [1] to [7], wherein the ultraviolet absorber (b) is an ultraviolet absorber having a silyl group having a hydrolyzable group bonded.

[9] The liquid composition according to any one of [1] to [8], wherein the infrared absorber (a) is indium tin oxide.

[10] The liquid composition according to any one of [1] to [9], wherein the binder component (d) is a silicon oxide matrix material component.

[11] The liquid composition according to [10], wherein the binder component (d) further contains a polyepoxide.

[12] A glass article comprising a glass substrate and a coating film formed by using the liquid composition as defined in any one of [1] to [11] on at least part of the surface of the glass substrate.

[13] The glass article according to [12], wherein the thickness of the coating film is from 1.0 to 7.0 μm.

[14] A process for producing a liquid composition for forming a coating film, which comprises:

a step (1) of mixing an infrared absorber (a) containing at least one member selected from indium tin oxide, antimony tin oxide and a composite tungsten oxide, a dispersing agent (c) having an acid value and/or an amine value, and a dispersion medium to obtain a dispersion; and a step (2) of mixing the above dispersion, an ultraviolet absorber (b) containing at least one member selected from a benzophenone compound, a triazine compound and a benzotriazole compound, and a binder component (d), wherein in the step (1), the content of the dispersing agent (c) in the dispersion is adjusted so that the product of the sum (mgKOH/g) of the acid value and the amine value of the dispersing agent (c), and the mass ratio of the dispersing agent (c) to the infrared absorber (a), is from 2 to 30 (mgKOH/g); or in the step (1), the dispersing agent (c) is a dispersing agent having an acid value of from 5 to 200 mgKOH/g, and the content of the dispersing agent (c) in the dispersion is adjusted so that its proportion is from 11 to 40 parts by mass per 100 parts by mass of the infrared absorber (a).

[15] The process for producing a composition according to [14], which further has, between the steps (1) and (2), a step (1') of adding a chelating agent (e) capable of forming a complex with the infrared absorber (a), the formed complex not substantially absorbing light having a visible light wavelength, to the dispersion and mixing them.

Advantageous Effects Of Invention

By the liquid composition of the present invention, it is possible to form a coating film sufficiently having an ultraviolet-absorbing ability and an infrared-absorbing ability, being securely colorless and transparent, and also being excellent in the weather resistance. According to the production process of the present invention, a liquid composition of the present invention which has sufficient effects can be produced. Further, the glass article of the present invention comprising a coating film by the liquid composition of the present invention is a glass article sufficiently having an ultraviolet-absorbing ability and an infrared-absorbing ability, being securely colorless and transparent and having weather resistance.

DESCRIPTION OF EMBODIMENTS

Now, embodiments of the present invention will be described.

[Liquid Composition of the Present Invention]

The liquid composition of the present invention is a liquid composition for forming a coating film, which comprises an infrared absorber (a) containing at least one member selected from indium tin oxide, antimony tin oxide and a composite tungsten oxide, an ultraviolet absorber (b) containing at least one member selected from a benzophenone compound, a triazine compound and a benzotriazole compound, a dispersing agent (c), a binder component (d) and a liquid medium (f); and has the following three embodiments depending upon the type of the dispersing agent (c) and its amount based on the infrared absorber (a).

(I) The dispersing agent (c) is a dispersing agent having an acid value and/or an amine value, and the dispersing agent (c) is contained in such an amount that the product of the sum (mgKOH/g) of the acid value and the amine value, and the mass ratio of the dispersing agent (c) to the infrared absorber (a), is from 2 to 30 (mgKOH/g).

(II) The dispersing agent (c) is a dispersing agent having an acid value of from 5 to 200 mgKOH/g, and the dispersing agent is contained in a proportion of from 11 to 40 parts by mass per 100 parts by mass of the infrared absorber (a).

(III) The liquid composition further contains a chelating agent (e) capable of forming a complex with the infrared absorber (a), the formed complex not substantially absorbing light having a visible light wavelength; the dispersing agent (c) is contained in a proportion of from 0.1 to 40 parts by mass per 100 parts by mass of the infrared absorber (a) and in such an amount that the product of the sum (mgKOH/g) of the acid value and the amine value of the dispersing agent (c), and the mass ratio of the dispersing agent (c) to the infrared absorbing agent (a), is from 0 to 30 (mgKOH/g); and the chelating agent (e) is contained in a proportion of from 2 to 50 parts by mass per 100 parts by mass of the infrared absorber (a).

Hereinafter, the liquid composition in the case of the above (I) will be referred to as a liquid composition according to a first embodiment, the liquid composition in the case of the above (II) as a liquid composition according to a second embodiment, and the liquid composition in the case of the above (Ill) as a liquid composition according to a third embodiment.

Further, the dispersion agent (c) in the liquid composition in the case of the above (I) (that is, the liquid composition according to a first embodiment) will be hereinafter referred to as a dispersing agent (c1). The dispersing agent (c1) is a dispersing agent having an acid value and/or an amine value.

The dispersing agent (c) in the liquid composition in the case of the above (II) (that is, the liquid composition according to a second embodiment) will be hereinafter referred to as a dispersing agent (c2). The dispersing agent (c2) is a dispersing agent having an acid value of from 5 to 200 mgKOH/g, and the dispersing agent (c2) may or may not have an amine value.

The dispersing agent (c) in the liquid composition in the case of the above (Ill) (that is, the liquid composition according to a third embodiment) will be hereinafter referred to as a dispersing agent (c3). The dispersing agent (c3) may have neither of the acid value and the amine value, may have one of them, or may have both of them.

<Liquid Composition According to a First Embodiment>

The liquid composition according to a first embodiment of the present invention is a liquid composition for forming a coating film comprising the following respective components (1) to (4) and (6).

(1) An infrared absorber (a) containing at least one member selected from indium tin oxide, antimony tin oxide and a composite tungsten oxide; hereinafter referred to as an infrared absorber (a) or component (a).

(2) An ultraviolet absorber (b) containing at least one member selected from a benzophenone compound, a triazine compound and a benzotriazole compound; hereinafter referred to as an ultraviolet absorber (b) or component (b).

(3) A dispersing agent (c1) having an acid value and/or an amine value: its content is such an amount that the product of the sum (mgKOH/g) of the acid value and the amine value of the dispersing agent (c1), and the mass ratio of the dispersing agent (c1) to the infrared absorber (a), is from 2 to 30 (mgKOH/g); hereinafter referred to as a dispersing agent (c1) or component (c1).

(4) Binder component (d): hereinafter sometimes referred to as component (d).

(6) Liquid medium (f): a dispersion medium or a solvent, and a compound which has a relatively low boiling point and which is liquid at room temperature. It comprises an organic compound such as an alcohol or an inorganic compound such as water, and it may be a mixture of two or more liquid media. Hereinafter sometimes referred to as component (f).

Now, the respective components will be described.

(1) Infrared Absorber (a)

The liquid composition according to a first embodiment of the present invention contains, in order that a coating film formed by using the liquid composition has an infrared-absorbing ability, an infrared absorber (a) containing at least one member selected from a composite tungsten oxide, antimony tin oxide (ATO) and indium tin oxide (ITO). In the present invention, such an infrared absorbed (a) is used in the form of fine particles.

The composite tungsten oxide may, specifically, be a composite tungsten oxide represented by the formula: $M_xW_yO_z$ (wherein element M is at least one element selected from Cs, Rb, K, Tl, In, Ba, Li, Ca, Sr, Fe and Sn, W is tungsten, O is oxygen, $0.001 \leq x/y \leq 1$, and $2.2 \leq z/y \leq 3.0$). The composite tungsten oxide represented by the above formula efficiently functions as an infrared absorber since free electrons in a sufficient amount are formed.

Here, fine particles of the composite tungsten oxide represented by the formula $M_xW_yO_z$, are excellent in durability when they have hexagonal, tetragonal or cubic structure, and accordingly they preferably contain at least one crystal structure selected from hexagonal, tetragonal and cubic crystal structures. In such a crystal structure, the amount (x) of the M element added is, as a value of x/y which is a molar ratio to the amount (y) of tungsten, at least 0.001 and at most 1.0, and the amount (z) of oxygen present is, as a value of z/y which is a molar ratio to the amount (y) of tungsten, at least 2.2 and at most 3.0.

Further, the value of x/y is preferably about 0.33. This is because the value of x/y theoretically calculated from the hexagonal crystal structure is 0.33, and by containing M element in such an amount that the value of x/y is about this value, fine particles of the composite tungsten oxide have preferred optical properties. Such a composite tungsten oxide may, for example, be specifically $Cs_{0.33}WO_3$, $Rb_{0.33}WO_3$, $K_{0.33}WO_3$ or $Ba_{0.33}WO_3$. However, the composite tungsten oxide used in the present invention is not limited thereto, and so long as the values of x/y and z/y are within the above ranges, the composite tungsten oxide has useful infrared absorbing property.

Such a composite tungsten oxide is an infrared absorber such that of a film having fine particles thereof are uniformly dispersed, a maximum transmittance is within a wavelength range of from 400 to 700 nm, and a minimum transmittance is within a wavelength range of from 700 to 1,800 nm.

The fine particles of the composite tungsten oxide represented by the formula $M_xW_yO_z$, may be produced by a conventional method. For example, composite tungsten oxide fine particles are obtained by using a tungsten compound starting material obtained by mixing an ammonium tungstate aqueous solution or a tungsten hexachloride solution with an aqueous solution of a hydrochloride, a nitrate, a sulfate, an oxalate, an oxide or the like of element M in a predetermined proportion, and subjecting it to a heat treatment in an inert gas atmosphere or in a reducing gas atmosphere.

The surface of the composite tungsten oxide fine particles is preferably covered with an oxide of a metal selected from Si, Ti, Zr, Al and the like, with a view to improving the weather resistance. The covering method is not particularly limited, and it is possible to cover the surface of the composite tungsten oxide fine particles by adding an alkoxide of the above metal to a solution having the composite tungsten oxide fine particles dispersed therein.

As the ATO fine particles and the ITO fine particles, it is possible to use without any particularly restriction fine particles prepared by a physical method of grinding a metal powder e.g. by a mechanochemical method; a chemical dry process such as a CVD method or a deposition method, a sputtering method, a thermal plasma method or a laser method; a method called a chemical wet process e.g. by a thermal decomposition method, a chemical reduction method, an electrolysis method, an ultrasonic method, a laser abrasion method, a supercritical fluid method or a microwave synthesis method.

Further, the crystal structure of such fine particles is not limited to a conventional cubic structure, and depending upon the type of the after-mentioned binder component (d), for example, hexagonal ITO having a relatively low infrared-absorbing ability may be used as the case requires.

The above composite tungsten oxide fine particles, the ATO fine particles and the ITO fine particles may be used alone as the infrared absorber (a) or may be used as a mixture of two or more. In the present invention, the ITO fine particles are preferably used in view of the transmission loss and the environmental safety. In the present invention, further, as the case requires, infrared-absorbing fine particles other than the above may be used as the infrared absorber (a) in combination with at least one member selected from the above composite tungsten oxide fine particles, ATO fine particles and ITO fine particles, within a range not to impair the effects of the present invention.

The average primary particles size of the fine particles of the infrared absorber (a) is preferably at most 100 nm, more preferably at most 50 nm, particularly preferably at most 30 nm.

When the average primary particle size is at most 100 nm, the fine particles will not tend to aggregate in a liquid composition containing the fine particles, and precipitation of the fine particles can be avoided. Further, the above particle size is preferred with a view to maintaining the transparency, whereby when a coating film is formed from a liquid composition containing them, cloudiness (haze) by scattering can be suppressed. Here, the lower limit of the average primary particle size is not particularly limited, and fine particles of the infrared absorber (a) at a level of 2 nm which can be produced by the present technology may also be used. Here, the average primary particle size of the fine particles is one measured in an image observed by a transmission electron microscope.

The content of the infrared absorber (a) in the liquid composition according to a first embodiment of the present invention is preferably from 1 to 80 parts by mass, more preferably from 5 to 60 parts by mass, particularly preferably from 10 to 40 parts by mass per 100 parts by mass of the binder component (d), whereby a coating film formed by using it has a sufficient infrared-absorbing ability, and the mechanical strength of the coating film can be secured.

Here, the inorganic fine particles used as the infrared absorber (a) in the present invention are blended in a dispersed state when the liquid composition for forming a coating film is formed. That is, the liquid composition according to a first embodiment of the present invention is produced by using a dispersion having inorganic fine particles dispersed in a dispersion medium. The agglomeration state of the infrared absorber (a) fine particles in the coating film to be formed reflects the agglomeration state in the material dispersion, and accordingly in order to maintain the transparency of the coating film, the fine particles of the infrared absorber (a) are preferably highly dispersed in the dispersion. Further, the infrared absorber (a) is considered to be colored yellow by a chelate bond with the following ultraviolet absorber (b), which should be suppressed. In the liquid composition according to a first embodiment of the present invention, by using the after-mentioned dispersing agent (c1), the dispersion property of the infrared absorber (a) fine particles is secured and further, the chelate bond between the infrared absorber (a) fine particles and the ultraviolet absorber (b) is suppressed.

(2) Ultraviolet Absorber (b)

The liquid composition according to a first embodiment of the present invention contains, in order that a coating film formed by using the liquid composition has an ultraviolet-absorbing ability, an ultraviolet absorber (b) containing at least one member selected from a benzophenone compound, a triazine compound and a benzotriazole compound.

The benzotriazole ultraviolet absorber may, for example, be specifically 2-[5-chloro(2H)-benzotriazol-2-yl]-4-methyl-6-(tert-butyl)phenol (its commercially available product may, for example, be TINUVIN 326 (tradename, manufactured by Ciba Japan)), octyl-3-[3-tert-4-hydroxy-5-[5-chloro-2H-benzotriazol-2-yl]propionate, 2-(2H-benzotriazol-2-yl)-4,6-di-tert-pentylphenol, 2-(2-hydroxy-5-methylphenyl)benzotriazole, 2-[2-hydroxy-3-(3,4,5,6-tetrahydrophthalimide-methyl)-5-methylphenyl]benzotriazole, 2-(2-hydroxy-5-tert-octylphenyl)benzotriazole, 2-(2-hydroxy-5-tert-butylphenyl)-2H-benzotriazole, methyl 3-(3-(2H-benzotriazol-2-yl)-5-t-butyl-4-(hydroxyphenyl)propionate, 2-(2H-benzotriazol-2-yl)-4,6-bis(1-methyl-1-phenylethyl)phenol or 2-(2H-benzotriazol-2-yl)-6-(1-methyl-1-phenylethyl)-4-(1,1,3,3-tetramethylbutyl)phenol. Among them, preferably 2-[5-chloro(2H)-benzotriazol-2-yl]-4-methyl-6-(tert-butyl)phenol is used.

The triazine ultraviolet absorber may, for example, be specifically 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butoxyphenyl)-6-(2,4-bis-butoxyphenyl)-1,3,5-triazine, 2-(2-hydroxy-4-[1-octylcarbonylethoxy]phenyl-4,6-bis(4-phenylphenyl)-1,3,5-triazine or TINUVIN 477 (tradename, manufactured by Ciba Japan). Among them, preferably 2-(2-hydroxy-4-[1-octylcarbonylethoxy]phenyl)-4,6-bis(4-phenylphenyl)-1,3,5-triazine is used.

The benzophenone ultraviolet absorber may, for example, be specifically 2,4-dihydroxybenzophenone, 2,2',3 (or 4, 5 or 6)-trihydroxybenzophenone, 2,2',4,4'-tetrahydroxybenzophenone, 2,4-dihydroxy-2',4'-dimethoxybenzophenone or 2-hydroxy-4-n-octoxybenzophenone. Among them, preferably 2,2',4,4'-tetrahydroxybenzophenone is used.

The maximum absorption wavelengths of light of the above-exemplified organic ultraviolet absorbers are within a range of from 325 to 425 nm, and are approximately within a range of from 325 to 390 nm in many cases. An organic ultraviolet absorber having an ability to absorb even ultraviolet rays having a relatively long wavelength is preferably used from its characteristics. Such an organic ultraviolet absorber, which has a phenolic hydroxy group, is considered to be likely to be colored yellow by being bonded to the inorganic fine particles constituting the infrared absorber (a) by a chelate bond. By the liquid composition according to a first embodiment of the present invention containing the after-mentioned dispersing agent (c1), the above chelate bond is suppressed, whereby it is possible to prevent developing of yellow color while maintaining the ultraviolet-absorbing ability.

Accordingly, the above effects of the liquid composition according to a first embodiment of the present invention are remarkable when an ultraviolet absorber (b) having absorption in an ultraviolet wavelength region and having a phenolic hydroxy group which is likely to be bonded to the inorganic fine particles constituting the infrared absorber (a) by a chelate bond is used.

In the present invention, such ultraviolet absorbers may be used alone or in combination of two or more. Further, among such ultraviolet absorbers, for the liquid composition according to a first embodiment of the present invention, the above-exemplified hydroxy group-containing benzophenone ultraviolet absorber is preferably used, which has a high solubility in a solvent and which has an absorption wavelength band within a preferred range. In the present invention, further, an ultraviolet absorbing material other than the above may be used as the ultraviolet absorber (b) in combination with at least one member selected from the above benzophenone compound, triazine compound and benzotriazole compound, as the case requires, within a range not to impair the effects of the present invention.

In the present invention, as such an ultraviolet absorber, an ultraviolet absorber which is insoluble in a solvent or which is hardly soluble in a solvent may be used. In such a case, it is preferred that the ultraviolet absorber is dispersed as fine particles in a dispersion medium to prepare a dispersion, and the dispersion is contained in the liquid composition. Further, in order to improve the dispersion property of the fine particles of the ultraviolet absorber in a coating film, the dispersion having fine particles of the ultraviolet absorber dispersed is preferably a dispersion having fine particles dispersed by using a dispersing agent.

The content of the ultraviolet absorber (b) in the liquid composition according to a first embodiment of the present invention is preferably from 1 to 50 parts by mass, more preferably from 5 to 40 parts by mass, particularly preferably from 8 to 30 parts by mass per 100 parts by mass of the binder component (d), whereby a coating film formed by using the liquid composition has a sufficient ultraviolet-absorbing ability, and the mechanical strength of the coating film can be secured.

In the liquid composition according to a first embodiment of the present invention, in order to prevent the ultraviolet absorber (b) from bleeding out from a coating film obtained by using the liquid composition, as the case requires, the ultraviolet absorber (b) may be one having the following structure. That is, in a case where the after-mentioned binder component (d) has a reactive group and a coating film is formed by its reaction, a functional group reactive with the above reactive group may be introduced into the ultraviolet absorber (b). Here, the compound to be used for this introduction is considered as a part of the binder component (d) when the content of the ultraviolet absorber (b) in the liquid composition is calculated.

For example, in a case where the binder component (d) is mainly constituted by a hydrolyzable silicon compound which is a silicon oxide matrix material component, a silyl group having a hydrolyzable group may be introduced to the ultraviolet absorber (b) by an appropriate method, and the ultraviolet absorber having a silyl group having a hydrolyzable group bonded thereto is contained in the liquid composition as the ultraviolet absorber (b). An ultraviolet absorber having a silyl group having a hydrolyzable group introduced will hereinafter be referred to as a silylated ultraviolet absorber.

Specifically, it is possible to use as the ultraviolet absorber (b) a reaction product of the above hydroxy group-containing benzophenone compound to be preferably used in the present invention, and a hydrolyzable silicon compound having a group reactive with a hydroxy group, such as an epoxy group (hereinafter sometimes referred to as "silylated benzophenone compound". When the silylated benzophenone compound is contained in the liquid composition together with the hydrolyzable silicon compound, they are co-crosslinked by a hydrolysis reaction to form a silicon oxide matrix. Thus, the hydroxy group-containing benzophenone compound residue derived from the silylated benzophenone compound is fixed to the silicon oxide matrix, thus preventing bleed out. As a result, of the coating film obtained, an ultraviolet-absorbing ability can be maintained over a long period of time.

Now, the silylated ultraviolet absorber will be described with reference to a silylated benzophenone compound as an example.

As the hydroxy group-containing benzophenone compound as a starting material for the above silylated benzophenone compound, a benzophenone compound having from 2 to 4 hydroxy groups, represented by the above formula (A), is preferably used from such a viewpoint that it has an excellent ultraviolet-absorbing ability even after being silylated. From the viewpoint of particularly the ability to absorb ultraviolet rays with a wavelength of up to 380 nm, the number of hydroxyl groups in the hydroxy group-containing benzophenone compound is more preferably 3 or 4.

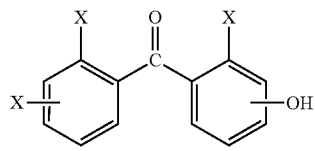

(A)

In the formula (A), each of Xs which may be the same or different from one another, is a hydrogen atom or a hydroxy group, provided that at least one of them is a hydroxy group.

Further, among the hydroxy group-containing benzophenone compounds represented by the above formula (A), in the present invention, 2,4-dihydroxybenzophenone, a 2,2',3 (or 4, 5 or 6)-trihydroxybenzophenone, 2,2',4,4'-tetrahydroxybenzophenone, etc. are more preferred, and 2,2',4,4'-tetrahydroxybenzophenone is particularly preferred. In the reaction of silylating the hydroxy group-containing benzophenone compound, one of such hydroxy group-containing benzophenone compounds may be used alone or two or more of them may be used in the form of a mixture.

An epoxy group-containing hydrolyzable silicon compound to be used for the reaction for silylating such a hydroxy group-containing benzophenone compound may be a trifunctional or bifunctional hydrolyzable silicon compound having a non-hydrolyzable monovalent organic group having an epoxy group bonded to a silicon atom. Preferred may, for example, be 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)ethyltrimethoxysilane, 2-(3,4-epoxycyclohexyl)ethylmethyldimethoxysilane, 2-(3,4-epoxycyclohexyl)ethyltriethoxysilane or 2-(3,4-epoxycyclohexyl)ethylmethyldiethoxysilane.

Among them, in the present invention, particularly preferred as the epoxy group-containing hydrolyzable silicon compound from the viewpoint of e.g. the solubility in the liquid composition may, for example, be 3-glycidoxypropyltrimethoxysilane, 2-(3,4-epoxycyclohexyl)ethyltrimethoxysilane, 3-glycidoxypropylmethyldimethoxysilane or 2-(3,4-epoxycyclohexyl)ethylmethyldimethoxysilane. In the reaction for silylating the hydroxy group-containing benzophenone compound, one of such epoxy group-containing hydrolyzable silicon compounds may be used alone, or two or more of them may be used in the form of a mixture.

As the method for obtaining the reaction product of the hydroxy group-containing benzophenone compound and the epoxy group-containing hydrolyzable silicon compound, a usual method for a silylation reaction may be used without any particular restriction, and specifically, the following method may be mentioned.

At least one of the hydroxy group-containing benzophenone compounds and at least one of the epoxy group-containing hydrolyzable silicon compounds are reacted, if necessary, in the presence of a catalyst. The amount of the epoxy group-containing hydrolyzable silicon compound to be used for the reaction is not particularly limited, but it is preferably from 0.5 to 5.0 mol, more preferably from 1.0 to 3.0 mol, per 1 mol of the hydroxy group-containing benzophenone compound. If the amount of the epoxy group-containing hydrolyzable silicon compound is less than 0.5 mol per 1 mol of the hydroxy group-containing benzophenone compound, in a case where the reaction product is to be added to the liquid composition for forming a coating film, the hydroxy group-containing benzophenone compound not silylated will be present substantially in the film and will be likely to bleed out. Further, the mechanical durability as a coating film may not be maintained. On the other hand, if the amount of the epoxy group-containing hydrolyzable silicon compound exceeds 5.0 mol per 1 mol of the hydroxy group-containing benzophenone compound, the absolute amount of the hydroxy group-containing benzophenone compound relating to the ultraviolet-absorption becomes small, whereby the ultraviolet-absorbing ability tends to be low.

The catalyst to be used for the silylation reaction is preferably a quaternary ammonium salt as disclosed in JP-A-58-10591. The quaternary ammonium salt may, for example, be tetramethylammonium chloride, tetraethylammonium chloride, benzyltrimethylammonium chloride or benzyltriethylammonium chloride.

The amount of the catalyst to be added to the reaction system is not particularly limited, but it is preferably from 0.005 to 10 parts by mass, more preferably from 0.01 to 5 parts by mass, per 100 parts by mass of the total of the hydroxy group-containing benzophenone compound and the epoxy group-containing hydrolyzable silicon compound. If the amount of the catalyst to be added is less than 0.005 part by mass per 100 parts by mass of the total of the hydroxy group-containing benzophenone compound and the epoxy group-containing hydrolyzable silicon compound, it tends to take long time for the reaction, and if it exceeds 10 parts by mass, when such a reaction product is added to the liquid composition for forming a coating film, the catalyst is likely to lower the stability of the liquid composition.

The above silylation reaction may be carried out by heating the mixture of the hydroxy group-containing benzophenone compound and the epoxy group-containing hydrolyzable silicon compound preferably in the above mentioned proportions in the presence of the catalyst within a temperature range of from 50 to 150° C. for from 4 to 20 hours. This reaction may be carried out in the absence of a solvent or may be carried out in a solvent capable of dissolving both the hydroxy group-containing benzophenone compound and the epoxy group-containing hydrolyzable silicon compound. A method of employing the solvent is preferred from the viewpoint of handling efficiency or control efficiency of the reaction. Such a solvent may, for example, be toluene, xylene, ethyl acetate or butyl acetate. Further, the amount of the solvent to be used may, for example, be at a level of from 10 to 300 parts by mass per 100 parts by mass of the total of the hydroxy group-containing benzophenone compound and the epoxy group-containing hydrolyzable silicon compound.

The silylated benzophenone compound to be preferably used in the present invention may, for example, be a reaction product obtained by reacting one or two hydroxy groups of a benzophenone compound containing at least three hydroxy groups with an epoxy group of an epoxy group-containing hydrolyzable silicon compound, more preferably 4-(2-hydroxy-3-(3-trimethoxysilyl)propoxy)propoxy)-2,2',4'-trihydroxybenzophenone represented by the following formula (b). Here, in the following formula (b), Me represents a methyl group.

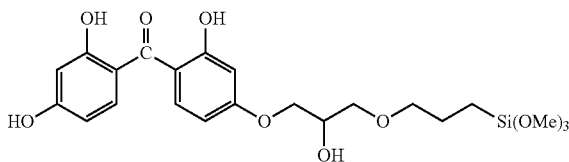

(b)

In the liquid composition according to a first embodiment of the present invention, in a case where the binder (d) component is composed mainly of the silicon oxide matrix material component, and the silylated benzophenone compound is contained as the ultraviolet absorber (b), the content of the silylated benzophenone compound is adjusted so that the amount of the hydroxy group-containing benzophenone compound residue in the silylated benzophenone compound agrees with the content of the ultraviolet absorber in the liquid composition. Further, the portion other than the hydroxy group-containing benzophenone compound residue in the silylated benzophenone compound is taken as the silicon oxide matrix material component in the binder (d) component.

(3) Dispersing Agent (c1)

The liquid composition according to a first embodiment of the present invention comprises a dispersing agent (c1) having an acid value or an amine value in such a content in the liquid composition that the product of the sum (mgKOH/g) of the acid value and the amine value of the dispersing agent (c1), and the mass ratio of the dispersing agent (c1) to the infrared absorbing agent (a), is from 2 to 30 (mgKOH/g).

The dispersing agent (c1) should meet the following two requirements.

The first requirement is that fine particles used as the infrared absorber (a) can be dispersed in the liquid composition with dispersion stability.

The second requirement is that a chelate bond between fine particles constituting the infrared absorber (a), and the ultraviolet absorber (b), which are both present in the liquid composition, is suppressed.

With respect to the first requirement, the respective fine particles constituting the infrared absorber (a) have been applied to various liquid compositions for forming a coating film, and the methods to use and select a dispersing agent which shows favorable dispersion property in the respective liquid compositions have been established.

However, in the conventional methods to use and select a dispersing agent which satisfy the above first requirement, the second requirement is not necessarily met, that is, the chelate bond between the fine particles constituting the infrared absorber (a) and the ultraviolet absorber (b) cannot necessarily be suppressed.

In the present invention, the acid value and the amine value of the dispersing agent are noted, and both the above first and second requirements are met by selecting a dispersing agent (c1) having at least one of them exceeding 0, and by adjusting its content in the liquid composition so that the product of the sum (mgKOH/g) of the acid value and the amine value of the dispersing agent (c1), and the mass ratio of the dispersing agent (c1) to the infrared absorber (a), is within the above specific range. The acid value is a mass (unit: mg) of potassium hydroxide (KOH) required to neutralize 1 g of the compound, and the amine value is a value represented by mg of KOH corresponding to the acid value, obtained by neutralization titration of the amino group with an acid. In this specification, the units of the acid value and the amine value are represented by mgKOH/g.

The dispersing agent (c1) having either one of the acid value and the amine value exceeding 0 may be specifically a dispersing agent comprising a high-molecular weight copolymer having an acidic group, a basic group or a substituent of such a group in the form of a salt, among high-molecular weight dispersing agents commonly used to disperse inorganic fine particles in various liquid compositions.

In the dispersing agent (c1), the moiety of the acidic group, the basic group or the substituent of such a group in the form of a salt, is interacted with the surface of the inorganic fine particles and adsorbed on the inorganic fine particles. Further, the dispersing agent (c1) is a compound having a compatible polymer chain so that it is spread in the liquid composition from this adsorbed portion.

Here, the type of the polymer chain in the dispersing agent (c1) may, for example, be an urethane, polyimide, alkyd, epoxy, polyester, melamine, phenol, acrylic, polyether, vinyl chloride, vinyl chloride/vinyl acetate copolymer, polyamide or polycarbonate type.

In the present invention, the type of the polymer chain in the dispersing agent (c1) to be used is properly selected depending upon the type of the binder component (d) in the liquid composition and the type of the solvent commonly used in accordance with the binder component (d). For example, in a case where the binder component (d) is composed mainly of the silicon oxide matrix material component, the liquid composition contains water/alcohol, and accordingly a polymer dispersing agent containing a polyethylene oxide group, or the like is particularly preferred.

Further, the molecular weight of the dispersing agent (c1) may, for example, be at a level of from 50 to 100,000, and is preferably at a level of from 2,000 to 100,000.

The acidic group, the basic group or the substituent of such a group in the form of a salt in the dispersing agent (c1) is not particularly limited so long as it is a group commonly used to disperse the fine particles constituting the infrared absorber (a) in various dispersing media, and specifically, the acidic group may, for example, be a carboxy group, a sulfonic acid group, a carboxylic acid group, a phosphoric acid group or a boric acid group. The basic group preferably has a primary, secondary or tertiary amino group or a nitrogen-containing heterocyclic group such as pyridine, pyrimidine or pyrazine. Further, the substituent of such a group in the form of a salt may, for example, be a carboxylate, an amine salt or an ammonium salt.

At least one of the acid value and the amine value in the dispersing agent (c1) should exceed 0. However, in the present invention, the content of the dispersing agent (c1) in the liquid composition is adjusted so that the product of the sum (mgKOH/g) of the acid value and the amine value of the dispersing agent (c1), and the mass ratio of the dispersing agent (c1) to the infrared absorber (a), is within the above range of from 2 to 30 (mgKOH/g).

That is, when the content of the infrared absorber (a) in the liquid composition is X g, the content of the dispersing agent (c1) is Y g, the acid value of the dispersing agent (c1) is G (mgKOH/g) and the amine value is H (mgKOH/g), and the product of the sum (G+H) (mgKOH/g) of the acid value and the amine value of the dispersing agent (c1), and the mass ratio (Y/X) of the dispersing agent (c1) to the infrared absorber (a), is P, the relation of $2 \leq P \leq 30$ must be satisfied. Preferably, the range of the product P is $2.5 \leq P \leq 25$, more preferably $3 \leq P \leq 20$. If the value of P is less than 2, the chelate bond with the ultraviolet absorber cannot be suppressed, and if it exceeds 30, the dispersion stability may be inhibited.

Here, the lower limit of the sum (G+H) (mgKOH/g) of the acid value and the amine value in the dispersing agent (c1) is preferably 5 mgKOH/g, more preferably 10 mgKOH/g, considering the function to suppress the chelate bond of the infrared absorber (a) fine particles and the ultraviolet absorber (b) in the dispersing agent (c1). Further, the upper limit of (G+H) (mgKOH/g) is preferably 250 mgKOH/g, more preferably 200 mgKOH/g, considering the molecular design of the dispersing agent (c1).

Further, in the liquid composition according to a first embodiment of the present invention, the lower limit of the mass ratio (Y/X) of the dispersing agent (c1) to the infrared absorber (a) is preferably 0.03, more preferably 0.05, considering that the dispersing agent (c1) uniformly and homogenously acts on the infrared absorber (a) as the liquid composition as a whole. Further, the upper limit of the mass ratio is preferably 0.50, more preferably 0.35, from the viewpoint of the dispersion stability.

In a case where a dispersing agent (c1) of which the sum (G+H) (mgKOH/g) of the acid value and the amine value is within the above preferred range is selected and used in the present invention, it is preferred to adjust the content of the dispersing agent (c1) so that the above mass ratio (Y/X) is within the above preferred range while the product P of the sum (G+H) (mgKOH/g) of the acid value and the amine value, and the mass ratio (Y/X) of the dispersing agent (c1) to the infrared absorber (a), satisfies the above relation of $2 \leq P \leq 30$.

The dispersing agent (c1) to be used in the present invention may be specifically a dispersing agent having the following acid value and amine value.

A dispersing agent having an acid value of from 40 to 200 mgKOH/g and an amine value of from 0 to 10 mgKOH/g, a dispersing agent having an acid value of from 0 to 10 mgKOH/g and an amine value of from 40 to 200 mgKOH/g, or a dispersing agent having an acid value of from 5 to 30 mgKOH/g and an amine value of from 5 to 30 mgKOH/g.

Further, as the dispersing agent (c1), a commercially available dispersing agent for inorganic fine particles may be used. Specifically, DISPERBYK and DISPARLON DA, tradenames, respectively manufactured by BYK Japan K. K. and Kusumoto Chemicals, Ltd., may, for example, be mentioned, and more specifically, dispersing agents as shown in the following Table 1 may be mentioned. The units for the acid value and the amine value are mgKOH/g.

TABLE 1

| Tradename | Acid value | Amine value | Solid content | Solvent |
|---|---|---|---|---|
| DISPERBYK-102 | 100 | — | 90 mass % | — |
| DISPERBYK-109 | 0 | 140 | >99.5 mass % | — |
| DISPERBYK-194 | 70 | — | 53 mass % | Water |
| DISPERBYK-2096 | 40 | — | 99 mass % | — |
| DISPERBYK-191 | 30 | 20 | 40 mass % | Water |
| DISPERBYK-180 | 95 | 95 | 79 mass % | — |
| DISPERBYK-190 | 10 | — | 40 mass % | Water |
| DISPARLON DA-375 | 14 | — | >95 mass % | — |
| DISPARLON DA-234 | 16 | 20 | >95 mass % | — |

(4) Binder Component (d)

The binder component (d) contained in the liquid composition according to a first embodiment of the present invention is a material component for forming a coating film. The binder component (d) is not particularly limited so long as it is a material component for forming a coating film, capable of constituting the liquid composition together with the above components (a) to (c1).

Specifically, a coating film to be formed on a substrate such as a glass plate may, for example, be a film comprising a thermoplastic resin, a film comprising a cured product of a curable resin, or a silicon oxide film by a sol-gel method, and the binder component (d) may, for example, be a thermoplastic resin, a curable resin or a silicon oxide matrix material component, commonly used for formation of such a film. The thermoplastic resin may, for example, be a thermoplastic acrylic resin such as polymethyl methacrylate. Further, the curable resin may be a resin which will be cured by heat or light such as ultraviolet rays (UV). Among them, in the present invention, it is preferred to use a silicon oxide matrix material component. Such resins may be used alone or in combination of two or more.

The resin which will be cured by heat may, for example, be a crosslinkable curable acrylic resin, a crosslinkable curable silicone resin, a phenol resin, a melamine resin or an epoxy resin, and the ultraviolet (UV) curable resin may, for example, be a UV curable acrylic resin or a UV curable epoxy resin. Such a curable resin is cured by heat or light to form a coating film on the substrate.

The binder component (d) to be used in the present invention is more preferably a binder component (d) composed mainly of a silicon oxide matrix material component which will form a silicon oxide matrix film by a sol-gel method. Here, if the amine value of the dispersing agent is high, the pot life of the liquid composition may be short. Accordingly, in a case where the binder component (d)

composed mainly of a silicon oxide matrix material component is used, it is preferred to use a dispersing agent having a low amine value.

Here, in this specification, the "silicon oxide matrix" by a sol-gel method means a polymer compound linearly or three dimensionally polymerized by a siloxane bond represented by —Si—O—Si—, obtainable by hydrolytic (co-)condensation of a hydrolyzable silicon compound. That is, the material component for the silicon oxide matrix is at least one member selected from hydrolyzable silicon compounds. Here, when a hydrolyzable silicon compound is subjected to hydrolytic (co-)condensation to obtain a silicon oxide matrix, water, an acid catalyst and the like are required, and in this specification, they are regarded as components different from the material component for the silicon oxide matrix or the binder component (d).

Further, in this specification, the "hydrolyzable silicon compound" generally means a group of silane compounds having at least one hydrolyzable group bonded to the silicon atom, and a partially hydrolyzed (co-)condensate of one or more of such a group of silane compounds. Further, the number of functional groups of the hydrolyzable silicon compound means the number of hydrolyzable groups bonded to the silicon atom in the compound of the group of silane compounds. Further, the partially hydrolyzed (co-)condensate may be a compound having a hydrolyzable group and a silanol group (a hydroxy group bonded to the silicon atom) or may be a compound having only a silanol group.

As the hydrolyzable silicon compound as the binder component (d) contained in the liquid composition according to a first embodiment of the present invention, at least part thereof is preferably a partially hydrolyzed condensate rather than only a compound (for example, tetraalkoxysilane) of the group of silane compounds, in view of the stability of the hydrolyzable silicon compound in the liquid composition and the uniform reactivity. Accordingly, it is preferred that a partially hydrolyzed condensate is used as a material for the liquid composition, or the compound of the group of silane compounds is used as a material and at least part of the compound is subjected to partially hydrolytic condensation when the liquid composition is produced. For example, it is preferred to obtain a liquid composition in such a manner that a tetraalkoxysilane is used, the tetraalkoxysilane and its reaction catalyst and other components constituting the liquid composition are mixed, and then in the mixture, a treatment to subject at least part of the tetraalkoxysilane to hydrolytic condensation (specifically, a stirring treatment at room temperature or with heating for a predetermined time) is carried out.

In a case where at least two compounds (for example, a tetrafunctional hydrolyzable silicon compound and a trifunctional hydrolyzable silicon compound) of the group of silane compounds are used, by preliminarily subjecting them to hydrolytic co-condensation to prepare a partially hydrolyzed co-condensate, a uniform coating film is likely to be formed from such a liquid composition. Further, also in the case of using the above silylated ultraviolet absorber, by preliminarily subjecting it with another hydrolyzable silicon compound to hydrolytic co-condensation, the ultraviolet absorber will more uniformly be dispersed in the silicon oxide matrix.

In the present invention, the material component for the silicon oxide matrix preferably contains a tetrafunctional hydrolyzable silicon compound (or its partially hydrolyzed condensate). In such a case, the liquid composition preferably further contains the after-mentioned flexibility-imparting component as the binder component (d). The silicon oxide matrix material component is also preferably one containing a tetrafunctional hydrolyzable silicon compound and a trifunctional hydrolyzable silicon compound (or a partially hydrolyzed condensate of each of them or their partially hydrolyzed co-condensate).

As a particularly preferred embodiment of the silicon oxide matrix material component, the hydrolyzable silicon compound consists solely of a tetrafunctional hydrolyzable silicon compound (or its partially hydrolyzed condensate), and it is contained together with the flexibility-imparting component as the binder component (d) in the liquid composition; or the hydrolyzable silicon compound is composed of a tetrafunctional hydrolyzable silicon compound and a trifunctional hydrolyzable silicon compound (or a partially hydrolyzed condensate of each of them or their partially hydrolyzed co-condensate), and they are contained, together with the flexibility-imparting component as the case requires, as the binder component (d) in the liquid composition.

The hydrolyzable group contained in the hydrolyzable silicon compound may, for example, be specifically an alkoxy group (including a substituted alkoxy group such as an alkoxy-substituted alkoxy group), an alkenyloxy group, an acyl group, an acyloxy group, an oxime group, an amide group, an amino group, an iminoxy group, an aminoxy group, an alkyl-substituted amino group, an isocyanate group or a chlorine atom. Among them, the hydrolyzable group is preferably an organoxy group such as an alkoxy group, an alkenyloxy group, an acyloxy group, an iminoxy group or an aminoxy group, particularly preferably an alkoxy group. The alkoxy group is preferably an alkoxy group having at most 4 carbon atoms or an alkoxy-substituted alkoxy group having at most 4 carbon atoms (such as a 2-methoxyethoxy group), particularly preferably a methoxy group or an ethoxy group.

The tetrafunctional hydrolyzable silicon compound as the compound of the group of silane compounds is a compound having four hydrolyzable groups bonded to the silicon atom. The four hydrolyzable groups may be the same or different from one another. The hydrolyzable group is preferably an alkoxy group, more preferably an alkoxy group having at most 4 carbon atoms, further preferably a methoxy group or an ethoxy group. Specifically, tetramethoxysilane, tetraethoxysilane, tetra-n-propoxysilane, tetra-n-butoxysilane, tetra-sec-butoxysilane or tetra-tert-butoxysilane may, for example, be mentioned, and in the present invention, preferably tetraethoxysilane, tetramethoxysilane or the like is used. They may be used alone or in combination of two or more.

The trifunctional hydrolyzable silicon compound as the compound of the group of silane compounds is a compound having three hydrolyzable groups and one non-hydrolyzable group bonded to the silicon atom. The three hydrolyzable groups may be the same or different from one another. The hydrolyzable group is preferably an alkoxy group, more preferably an alkoxy group having at most 4 carbon atoms, more preferably a methoxy group or an ethoxy group.

The non-hydrolyzable group is preferably a non-hydrolyzable monovalent organic group having or not having a functional group, more preferably a non-hydrolyzable monovalent organic group having a functional group. The non-hydrolyzable monovalent organic group is an organic group such that the organic group is bonded to the silicon atom with a carbon-silicon bond, the atom at the terminal is a carbon atom.

Here, the functional group used in this specification is a term comprehensively indicating a reactive group, distinguished from a mere substituent, and for example, a non-reactive group such as a saturated hydrocarbon group is not included. Further, an addition-polymerizable unsaturated double bond (ethylenic double bond) not involved in the formation of a main chain of a polymer compound, which a monomer may have in its side chain, is considered as one type of functional groups. Further, the term "(meth)acrylic" such as a (meth)acrylate in this specification means both "acrylic" and "methacrylic".

Among the above non-hydrolyzable monovalent organic groups, the non-hydrolyzable monovalent organic group having no functional group is preferably a hydrocarbon group having no addition-polymerizable unsaturated double bond such as an alkyl group or an aryl group, or a halogenated hydrocarbon group having no addition-polymerizable unsaturated double bond such as a halogenated alkyl group. The non-hydrolyzable monovalent organic group having no functional group particularly preferably has at most 20, more preferably at most 10 carbon atoms. Such a monovalent organic group is preferably an alkyl group having at most 4 carbon atoms.

The trifunctional hydrolyzable silicon compound having a non-hydrolyzable monovalent organic group having no functional group may, for example, be specifically methyltrimethoxysilane, methytriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, phenyltrimethoxysilane, phenyltriethoxysilane or phenyltriacetoxysilane. They may be used alone or in combination of two or more.

The functional group in the non-hydrolyzable monovalent organic group having a functional group may, for example, be an epoxy group, a (meth)acryloxy group, a primary or secondary amino group, an oxetanyl group, a vinyl group, a styryl group, a ureido group, a mercapto group, an isocyanate group, a cyano group or a halogen atom, and is preferably an epoxy group, a (meth)acryloxy group, a primary or secondary amino group, an oxetanyl group, a vinyl group, a ureido group, a mercapto group or the like. Particularly, it is preferably an epoxy group, a primary or secondary amino group or a (meth)acryloxy group. The monovalent organic group having an epoxy group is preferably a monovalent organic group having a glycidoxy group or a 3,4-epoxycyclohexyl group, and the organic group having a primary or secondary amino group is preferably a monovalent organic group having an amino group, a monoalkylamino group, a phenylamino group or a N-(aminoalkyl)amino group.

There may be two or more functional groups in the monovalent organic group, however, except for a case of a primary or secondary amino group, a monovalent organic group having one functional group is preferred. In the case of a primary or secondary amino group, the monovalent organic group may have at least two amino groups, and in such a case, preferred is a monovalent organic group having one primary amino group and one secondary amino group, for example, a N-(2-aminoethyl)-3-aminopropyl group or a 3-ureidopropyl group. The total number of carbon atoms in such a monovalent organic group having a functional group is preferably at most 20, more preferably at most 10.

The trifunctional hydrolyzable silicon compound having a non-hydrolyzable monovalent organic group having a functional group may, for example, be specifically the following compounds.

Vinyltrimethoxysilane, vinyltriethoxysilane, vinyltriacetoxysilane, vinyltris(2-methoxyethoxy)silane, vinyltriisopropenoxysilane, p-styryltrimethoxysilane, 3-glycidoxypropyltrimethoxysilane, 3-glycidoxypropyltriethoxysilane, 5,6-epoxyhexyltrimethoxysilane, 9,10-epoxydecyltrimethoxysilane, 2-(3,4-epoxycyclohexyl)ethyltrimethoxysilane, 2-(3,4-epoxycyclohexyl)ethyltriethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-ureidopropyltriethoxysilane, 3-methacryloxypropyltrimethoxysilane, 3-methacryloxypropyltriethoxysilane, 3-acryloxypropyltrimethoxysilane, di-(3-methacryloxy)propyltriethoxysilane, 3-isocyanatepropyltriethoxysilane, 3-chloropropyltrimethoxysilane, 3-chloropropyltriethoxysilane, 3-chloropropyltripropoxysilane, 3,3,3-trifluoropropyltrimethoxysilane, 3-mercaptopropyltrimethoxysilane, 3-mercaptopropyltriethoxysilane and 2-cyanoethyltrimethoxysilane may, for example, be mentioned.

Among them, preferred is a trifunctional hydrolyzable silicon compound having one monovalent organic group having, at the terminal of an alkyl group having 2 or 3 carbon atoms, any functional group selected from a glycidoxy group, a 2,3-epoxycyclohexyl group, an amino group, an alkylamino group (the alkyl group having at most 4 carbon atoms), a phenylamino group, a N-(aminoalkyl) amino group (the alkyl group having at most 4 carbon atoms) and a (meth)acryloxy group, and three alkoxy groups having at most 4 carbon atoms, bonded to the silicon atom.

Such a compound may, for example, be specifically 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-methacryloxypropyltrimethoxysilane or di-(3-methacryloxy)propyltriethoxysilane. In view of the reactivity with the silane compound, particularly preferred is 3-glycidoxypropyltrimethoxysilane, 3-glycidoxypropyltriethoxysilane, 2-(3,4-epoxycyclohexyl)ethyltrimethoxysilane or 2-(3,4-epoxycyclohexyl)ethyltriethoxysilane. They may be used alone or in combination of two or more.

As the silicon oxide matrix material component, as the case requires, a bifunctional hydrolyzable silicon compound may be contained.

The bifunctional hydrolyzable silicon compound is a compound having two hydrolyzable groups and two non-hydrolyzable groups bonded to the silicon atom. The two hydrolyzable groups may be the same or different from each other. The hydrolyzable group is preferably an alkoxy group, more preferably an alkoxy group having at most 4 carbon atoms, further preferably a methoxy group or an ethoxy group.

The non-hydrolyzable group is preferably a non-hydrolyzable monovalent organic group. The non-hydrolyzable monovalent organic group may have the same functional group as in the trifunctional hydrolyzable silicon compound as the case requires.

The bifunctional hydrolyzable silicon compound may, for example, be specifically dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, 3-chloropropylmethyldimethoxysilane, 3-chloropropylmethyldiethoxysilane, 3-chloropropylmethyldipropoxysilane, 3,3,3-trifluoropropylmethyldimethoxysilane, 3-methacryloxypropylmethyldimethoxysilane, 3-acryloxypropylmethyldimethoxysilane, 3-aminopropylmethyldimethoxysilane, 3-aminopropylmethyldiethoxysilane, 3-mercaptopropylmethyldimethoxysilane, 3-mercaptopropylmethyldiethoxysilane, N-(2-aminoethyl)-3-aminopropylmethyldimethoxysilane or 2-cyanoethylmethyldimethoxysilane. They may be used alone or in combination of two or more.

Further, as the silicon oxide matrix material component, each of the tetrafunctional hydrolyzable silicon compound, the trifunctional hydrolyzable silicon compound and the bifunctional hydrolyzable silicon compound may be contained in the liquid composition as it is, or may be contained as a partially hydrolyzed condensate thereof, or may be contained as a partially hydrolyzed co-condensate of two or more of them. Hereinafter a partially hydrolyzed condensate and a partially hydrolyzed co-condensate will sometimes be generally referred to as a partially hydrolyzed (co-)condensate.

The partially hydrolyzed (co-)condensate is an oligomer (multimer) formed by hydrolysis of the hydrolyzable silicon compound, followed by dehydration condensation. The partially hydrolyzed (co-)condensate is usually a high molecular weight product of such a level that it dissolves in a solvent. The partially hydrolyzed (co-)condensate has hydrolyzable groups or silanol groups, and has such a nature that it further undergoes hydrolytic (co-)condensation to form a final cured product. Only from one type of hydrolyzable silicon compound, the partially hydrolyzed condensate may be obtained, or from two or more types of hydrolyzable silicon compounds, a partially hydrolyzed co-condensate may be obtained as their co-condensate.

The partial hydrolytic (co-)condensation of the hydrolyzable silicon compound may be carried out, for example, be by stirring a reaction liquid having a lower alcohol solution of the hydrolyzable silicon compound and water added thereto, in the presence of an acid catalyst, at from 10 to 40° C. for from 1 to 48 hours. The acid catalyst to be used for the reaction may, for example, be specifically an inorganic acid such as nitric acid, hydrochloric acid, sulfuric acid or phosphoric acid, a carboxylic acid such as formic acid, acetic acid, propionic acid, glycolic acid, oxalic acid, malonic acid, succinic acid, maleic acid, phthalic acid, citric acid or malic acid, or a sulfonic acid such as methanesulfonic acid. The addition amount of the acid may be decided without any particular restriction within a range where the function as a catalyst can be fulfilled, and specifically, it may be an amount of from about 3.0 to about 0.001 mol/L as the amount relative to the volume of the reaction solution containing the hydrolyzable silicon compound and the like.

The tetrafunctional hydrolyzable silicon compound, the trifunctional hydrolyzable silicon compound and the bifunctional hydrolyzable silicon compound are distinguished from one another as units finally constituting the silicon oxide matrix, regardless of the state in which they are contained. Hereinafter, as the binder component (d), for example, with respect to the tetrafunctional hydrolyzable silicon compound, the compound itself and its partially hydrolyzed condensate, and a component derived from the hydrolyzable silicon compound in the partially hydrolyzed co-condensate are referred to as a component derived from the tetrafunctional hydrolyzable silicon compound.

The hydrolyzable silicon compound as the silicon oxide matrix material component is, as described above, preferably constituted (1) only by a component derived from the tetrafunctional hydrolyzable silicon compound or (2) a component derived from the tetrafunctional hydrolyzable silicon compound and a component derived from the trifunctional hydrolyzable silicon compound. In the case of (1), the liquid composition particularly preferably further contains a flexibility-imparting component as the binder component (d) so as to acquire sufficient crack resistance while a coating film obtainable by using such a liquid composition has a certain film thickness. Further, in the case of (2), the ratio of the content of the component derived from the tetrafunctional hydrolyzable silicon compound to the component derived from the trifunctional hydrolyzable silicon compound is, by the mass ratio of the component derived from the tetrafunctional hydrolyzable silicon compound/the component derived from the trifunctional hydrolyzable silicon compound, preferably from 30/70 to 95/5, more preferably from 40/60 to 90/10, most preferably from 50/50 to 85/25.

The component derived from the bifunctional hydrolyzable silicon compound is optionally used as the case requires in the case of (1) or (2). Its content is preferably at most 30 mass % to the total amount of the hydrolyzable silicon compounds.

In the liquid composition according to a first embodiment of the present invention, in a case where the binder component (d) is mainly composed of the silicon oxide matrix material component, the hydrolyzable silicon compound contained is subjected to hydrolytic (co-)condensation and dried to form a coating film. This reaction is usually carried out in the presence of an acid catalyst and water, in the same manner as the partial hydrolytic (co-)condensation of the hydrolyzable silicon compound. Accordingly, the liquid composition contains an acid catalyst and water. The type and the content of the acid catalyst to be used are the same as in the case of the partial hydrolytic (co-) condensation.

The amount of water which the liquid composition contains for hydrolytic (co-) condensation of the hydrolyzable silicon compound, is not particularly limited so long as it is sufficient for hydrolytic (co-)condensation of the hydrolyzable silicon compound. However, it is preferably from 1 to 20 equivalent amount, more preferably from 4 to 18 equivalent amount, by the molar ratio to the amount of the hydrolyzable silicon compound contained as the silicon oxide matrix material component as calculated as $SiO_2$. If the amount of water is less than 1 equivalent amount by the above molar ratio, the hydrolysis will hardly proceed, and the liquid composition may be repelled depending upon the substrate at the time of coating, or the haze may increase, and if it exceeds 20 equivalent amount, the hydrolysis rate will be high, and the long term storage property may be insufficient in some cases.

In a case where the binder component (d) is composed mainly of the silicon oxide matrix material component, as mentioned above, a flexibility-imparting component which imparts flexibility to the silicon oxide matrix may be and is preferably contained in the liquid composition as an optional component. The flexibility-imparting component contributes to preventing cracking of a coating film obtainable from the liquid composition.

Blending of the flexibility-imparting component is effective regardless of the constitution of the silicon oxide matrix material component, however, particularly, the silicon oxide matrix composed only by the tetrafunctional hydrolyzable silicon compound has insufficient flexibility in some cases, and when the liquid composition contains the tetrafunctional hydrolyzable silicon compound and the flexibility-imparting component, a coating film excellent in both the mechanical strength and the crack resistance can easily be prepared.

Here, the flexibility-imparting component is considered as a part of the binder component (d) when the content of the ultraviolet absorber (b) in the liquid composition is calculated.

The flexibility-imparting component may, for example, be an organic resin such as a silicone resin, an acrylic resin, a polyester resin, a polyurethane resin, a hydrophilic organic resin having polyoxyalkylene groups, or an epoxy resin, or an organic compound such as glycerin.

In a case where an organic resin is used as the flexibility-imparting component, its state is preferably liquid or fine particles. Further, the organic resin may be a curable resin which will be crosslinked and cured at the time of curing, drying or the like of the silicon oxide matrix material component. In such a case, within a range not to impair the properties of the silicon oxide matrix, a part of the silicon oxide matrix material component and the curable resin as the flexibility-imparting component may partially be reacted and crosslinked.

Among the flexibility-imparting components, the silicone resin is preferably a silicone oil including various modified silicone oils, a silicone rubber formed by partially or entirely crosslinking a diorganosilicone having a hydrolyzable silyl group or a polymerizable group-containing organic group at its terminal.

The hydrophilic organic resin having polyoxyalkylene groups is preferably polyethylene glycol (PEG), a polyether phosphate polymer, or the like.

The polyurethane resin may be preferably a polyurethane rubber or the like, and the acrylic resin may be preferably an acrylonitrile rubber, a homopolymer of an alkyl acrylate, a homopolymer of an alkyl methacrylate, a copolymer of an alkyl acrylate with a monomer copolymerizable with the alkyl acrylate, a copolymer of an alkyl methacrylate with a monomer copolymerizable with the alkyl methacrylate, or the like. The monomer copolymerizable with the alkyl (meth)acrylate may be a hydroxyalkyl ester of (meth)acrylic acid, a (meth)acrylate having a polyoxyalkylene group, a (meth)acrylate having a partial structure of the ultraviolet absorber, a (meth)acrylate having a silicon atoms, or the like.

In a case where an epoxy resin is used as the flexibility-imparting component, it is preferred to use a polyepoxide and a curing agent in combination or to use a polyepoxide alone. A polyepoxide is a general term for compounds having a plurality of epoxy groups. That is, an average number of epoxy groups in a polyepoxide is at least 2, but in the present invention, a polyepoxide is preferred wherein the average number of epoxy groups is from 2 to 10.

As such a polyepoxide, preferred is a polyglycidyl compound such as a polyglycidyl ether compound, a polyglycidyl ester compound or a polyglycidyl amine compound. Further, the polyepoxide may be either an aliphatic polyepoxide or an aromatic polyepoxide, and preferred is an aliphatic polyepoxide. They are compounds having at least two epoxy groups.

Among them, a polyglycidyl ether compound is preferred, and an aliphatic polyglycidyl ether compound is particularly preferred. The polyglycidyl ether compound is preferably a glycidyl ether of an at least bifunctional alcohol, particularly preferably a glycidyl ether of an at least trifunctional alcohol, since it is thereby possible to improve the light resistance. Here, such an alcohol is preferably an aliphatic alcohol, an alicyclic alcohol or a sugar alcohol.

Specifically, ethylene glycol diglycidyl ether, polyethylene glycol diglycidyl ether, propylene glycol diglycidyl ether, polypropylene glycol diglycidyl ether, neopentyl glycol diglycidyl ether, glycerol polyglycidyl ether, diglycerol polyglycidyl ether, polyglycerol polyglycidyl ether, trimethylolpropane polyglycidyl ether, sorbitol polyglycidyl ether or pentaerythritol polyglycidyl ether may, for example, be mentioned. They may be used alone or in combination of two or more.

Among them, preferred is a polyglycidyl ether of an aliphatic polyol having at least three hydroxy groups (one wherein an average number of glycidyl groups (epoxy groups) per one molecule exceeds 2) such as glycerol polyglycidyl ether, diglycerol polyglycidyl ether, polyglycerol polyglycidyl ether or sorbitol polyglycidyl ether, since the light resistance can further be improved. They may be used alone or in combination of two or more.

In the present invention, among the flexibility-imparting components, preferred is an epoxy resin particularly a polyepoxide, PEG, glycerin or the like, whereby a sufficient flexibility can be imparted to the obtainable coating film while the mechanical strength is maintained. Further, the epoxy resin particularly the polyepoxide, PEG, glycerin or the like has, in addition to a function to prevent cracks by light irradiation over a long period of time, a function to prevent a decrease in the ultraviolet-absorbing ability of the benzophenone ultraviolet absorber while securing the ultraviolet absorbing film to be colorless and transparent, thereby to improve the light resistance. In the present invention, among them, a polyepoxide is particularly preferred.

The content of the flexibility-imparting component in the liquid composition is not particularly limited so long as the flexibility can be imparted to the ultraviolet absorbing film and the crack resistance can be improved, without impairing the effects of the present invention. However, it is preferably from 0.1 to 20 parts by mass, more preferably from 1.0 to 20 parts by mass per 100 parts by mass of the silicon oxide matrix material component.

In the liquid composition according to a first embodiment of the present invention, the content of the binder component (d) is preferably from 3 to 30 mass %, more preferably from 5 to 20 mass %, to the total amount of the solid content in the liquid composition.

Further, in the liquid composition according to a first embodiment of the present invention, in a case where the binder component (d) is composed mainly of the silicon oxide matrix material component, the content of the silicon oxide matrix material component in the liquid composition is preferably from 1 to 20 mass %, more preferably from 3 to 15 mass % as the $SiO_2$ content obtained by calculating the silicon atoms contained in the silicon oxide matrix material component as $SiO_2$, to the entire amount of the liquid composition. If the content of the silicon oxide matrix material component to the entire amount of the liquid composition is less than 1 mass % as calculated as $SiO_2$, the amount of application of the liquid composition to obtain a coating film having a desired film thickness should be large and as a result, the appearance may be impaired, and if it exceeds 20 mass %, the film thickness in a case where the liquid composition is applied tends to be thick, whereby cracking may occur on the obtainable coating film.

(5) Optional Component

The liquid composition according to a first embodiment of the present invention contains the above components (a) to (d) as essential components, and may contain various optional compounding ingredients as the case requires within a range not to impair the effects of the present invention.

(5-1) Chelating Agent (e)

The liquid composition according to a first embodiment of the present invention preferably contains, as an optional component, a chelating agent (e) capable of forming a complex with the infrared absorber (a), the formed complex not substantially absorbing light having a visible light wavelength. Here, "not substantially absorbing" means, for example, as follows. A liquid composition containing 50 parts by mass of the chelating agent (e) per 100 parts by mass of the infrared absorber (a) is applied to form a film on a substrate so that the infrared absorber (a) is deposited on the substrate in an amount of 0.7 g/m$^2$, the value of YI is measured in accordance with JIS-K7105 (1981) with respect to the obtained substrate provided with a coating film, and the value of YI is measured only with respect to the substrate, and their difference is at most 2.0. Hereinafter, such a chelating agent will be referred to as a chelating agent (e) or component (e).

The chelating agent (e) to be used in the present invention is not particularly limited so long as it is a chelating agent capable of forming a complex with the infrared absorber (a), the formed complex not substantially absorbing light having a visible light wavelength. The chelating agent (e) is considered to also have a function to assist the effect of the dispersing agent (c1) to suppress a chelate bond between the infrared absorber (a) fine particles and the ultraviolet absorber (b). Specifically, the chelating agent (e) is considered to suppress the chelate bond by the ultraviolet absorber (b) by forming a chelate bond to a portion where the dispersing agent (c1) is not adsorbed on the surface of the inorganic fine particles constituting the infrared absorber (a).

Such a chelating agent (e) may, for example, be specifically an aminocarboxylic acid chelating agent, a phosphonic acid chelating agent or a chelate metal salt.

The aminocarboxylic acid chelating agent may, for example, be specifically dihydroxyethylglycine (DHEG), hydroxyethylethylenediaminetriacetic acid (HEDTA) or hydroxyethyliminodiacetic acid (HIDA).

Further, the phosphonic acid chelating agent may, for example, be specifically hydroxyethylidene diphosphonic acid. The chelate metal salt may, for example, be an aminocarboxylate.

In the present invention, as the chelating agent (e), a commercially available product may be used. The commercially available product may, for example, be CHELEST GA (dihydroxyethylglycine), CHELEST PH210 (1-hydroxyethylidene-1,1-diphosphonic acid solution) or CHELEST MZ-8 (aminocarboxylate), tradenames, manufactured by CHELEST CORPORATION.

The content of the chelating agent (e) in the liquid composition according to a first embodiment of the present invention is preferably from 2 to 50 parts by mass, more preferably from 5 to 30 parts by mass per 100 parts by mass of the infrared absorber (a).

(5-2) Other Solid Components

The liquid composition according to a first embodiment of the present invention may further contain additives such as a defoaming agent and a viscosity-adjusting agent for the purpose of improving the coating property to the substrate, and may contain additives such as an adhesion-imparting agent for the purpose of improving the adhesion to the substrate. The content of each of such additives is preferably from 0.01 to 2 parts by mass per 100 parts by mass of the binder component (d) in the liquid composition. Further, the liquid composition according to a first embodiment of the present invention may contain a dye, a pigment, a filler or the like within a range not to impair the effects of the present invention.

(6) Liquid Medium (f)

The liquid composition according to a first embodiment of the present invention is usually preferred in the form of a solution or dispersion having the infrared absorber (a), the ultraviolet absorber (b), the dispersing agent (c1) and the binder component (d) as essential components in predetermined amounts, and various additives such as the chelating agent (e) as optional compounding ingredients in optional amounts, dissolved or dispersed in a liquid medium (f). It is necessary that all the solid contents in the liquid composition are stably dissolved or dispersed in the liquid medium (f).

The liquid medium (f) means a dispersion medium in which solid fine particles of e.g. the infrared absorber (a) are dispersed and a solvent in which the infrared absorber (b), the binder component (d) and the like are dissolved, and is a compound having a relatively low boiling point, which is liquid at room temperature. The liquid medium (f) comprises an organic compound such as an alcohol or an inorganic compound such as water, and may be a mixture of two or more. Further, the dispersion medium and the solvent may be the same liquid medium, or may be different liquid media. In a case where the dispersion medium and the solvent are different from each other, the liquid medium (f) in the liquid composition is a mixture of the dispersion medium and the solvent.

In a case where the liquid composition according to a first embodiment of the present invention is produced by mixing at least one dispersion in which the solid fine particles of e.g. the infrared absorber (a) are dispersed and at least one solution in which the ultraviolet absorber (b), the binder component (d) and the like are dissolved, the dispersion medium in the dispersion and the solvent in the solution are compatible with each other, and usually the liquid medium (f) in the obtainable liquid composition is required to be a uniform mixture. Since there are fewer restrictions on the dissolving-ability except for the dissolving-ability to the dispersing agent (c1), it is preferred to select a solvent with restrictions on the dissolving-ability and the like, and to use the solvent as the dispersion medium or to use a liquid medium compatible with the solvent as the dispersion medium.

That is, the liquid medium to be used is not particularly limited so long as it is a solvent in which mainly the binder component (d) and the ultraviolet absorber (b) can stably be dissolved. Depending upon the solvent selected here, a dispersing agent (c1) containing, as a constituting part, a polymer chain compatible with the solvent is properly selected within the range of the present invention, and a dispersion of fine particles of the infrared absorber (a) is produced by using the solvent together with the dispersing agent (c1), and using the obtained dispersion, the fine particles of the infrared absorber (a) can stably be dispersed in the liquid composition.

The binder component (d) and the ultraviolet absorber (b) may be used for production of the liquid composition as separate solutions or may be used in the form of one solution. Further, in the dispersion of the fine particles of the infrared absorber (a), the binder component (d) or the ultraviolet absorber (b) may be dissolved. Preferably, a dispersion of the fine particles of the infrared absorber (a), a solution of the infrared absorber (b) and a solution of the binder component (d) are mixed to produce the liquid composition according to a first embodiment of the present invention. Further, optional components such as the chelating agent (e) may also be used as a dispersion or a solution, or may be used as blended in the dispersion of the infrared absorber (a) or the solution of the ultraviolet absorber (b)

and the like. In a case where the compounding ingredients are provided in the form of a solution or dispersion as mentioned above, the solvent or the dispersion medium may be used as it is without being removed, so that it constitutes a part of the liquid medium (f) in the liquid composition.

The liquid medium may, for example, be specifically a ketone such as acetone, methyl ethyl ketone, methyl isobutyl ketone or cyclohexanone; an ether such as tetrahydrofuran, 1,4-dioxane or 1,2-dimethoxyethane, an ester such as ethyl acetate, butyl acetate or methoxyethyl acetate; an alcohol such as methanol, ethanol, 1-propanol, 2-propanol, 1-butanol, 2-butanol, 2-methyl-1-propanol, 2-methoxyethanol, 4-methyl-2-pentanol, 2-butoxyethanol, 1-methoxy-2-propanol or diacetone alcohol; a hydrocarbon such as n-hexane, n-heptane, isooctane, benzene, toluene, xylene, gasoline, gas oil or coal oil; acetonitrile, nitromethane or water.

They may be used alone or in combination of two or more. Further, the amount of the liquid medium to be used is properly adjusted depending upon the types, the blend ratio, and the like of the above essential components (a) to (d).

Here, in the liquid composition according to a first embodiment of the present invention, in a case where the binder component (d) is composed mainly of the silicon oxide matrix material component, in order that the respective components contained in the liquid composition are stably dissolved or dispersed, the liquid medium (f) contains at least 20 mass %, preferably at least 50 mass % of an alcohol. The alcohol to be used for the liquid medium is preferably methanol, ethanol, 1-propanol, 2-propanol, 1-butanol, 2-butanol, 2-methyl-1-propanol, 1-methoxy-2-propanol, 2-ethoxyethanol, 4-methyl-2-pentanol, 2-butoxyethanol or the like, and among them, in view of favorable solubility of the silicon oxide matrix material component and favorable coating property on the substrate, an alcohol having a boiling point of from 80 to 160° C. is preferred. Specifically, preferred is ethanol, 1-propanol, 2-propanol, 1-butanol, 2-butanol, 2-methyl-1-propanol, 1-methoxy-2-propanol, 2-ethoxyethanol, 4-methyl-2-pentanol or 2-butoxyethanol.

Further, the liquid medium to be used for the liquid composition may contain the solvent used in the process for producing the binder component (d) or by-products as they are, for example, in a case where a partially hydrolyzed (co-)condensate of the hydrolyzable silicon compound is contained, the lower alcohol or the like formed by hydrolysis of the material hydrolyzable silicon compound (such as an alkyltrialkoxysilane) in the production process, an alcohol used as the solvent, and the like.

Further, in a case where the binder component (d) is composed mainly of the silicon oxide matrix material component, in the liquid composition, another liquid medium other than the alcohol miscible with water/alcohol may be used in combination as a liquid medium other than the above, and such a liquid medium may, for example, be a ketone such as acetone or acetylacetone, an ester such as ethyl acetate or isobutyl acetate; or an ether such as propylene glycol monomethyl ether, dipropylene glycol monomethyl ether or diisopropyl ether.

The amount of the liquid medium (f) contained in the liquid composition is preferably from 100 to 2,500 parts by mass, more preferably from 250 to 1,000 parts by mass per 100 parts by mass of the total solid content in the liquid composition.

Further, in a case where the liquid composition according to a first embodiment of the present invention contains the hydrolyzable silicon compound itself as the silicon oxide matrix material component, a treatment to subject the hydrolyzable silicon compound to partial hydrolytic (co-)condensation may be carried out so as to stabilize the liquid composition e.g. during storage. This partial hydrolytic (co-)condensation is preferably carried out under the same reaction conditions as above, in the presence of the same acid catalyst as above. Usually, at least one type of hydrolyzable silicon compound itself is mixed as the case requires, followed by stirring in the presence of an acid catalyst at room temperature for a predetermined time, whereby the object can be achieved.

The liquid composition according to a first embodiment of the present invention has been described above. Now, the liquid composition according to a second embodiment of the present invention will be described except for the points in common with the liquid composition according to a first embodiment of the present invention.

<Liquid Composition According to a Second Embodiment>

The liquid composition according to a second embodiment of the present invention is a liquid composition having the same composition as the liquid composition according to a first embodiment except that the specifications for the type and the content of the dispersing agent are different from those of the liquid composition according to a first embodiment. That is, the liquid composition according to a second embodiment of the present invention comprises the same infrared absorber (a), ultraviolet absorber (b), binder component (d) and liquid medium (f) as those contained in the liquid composition according to a first embodiment, and further contains a dispersing agent (c2) having an acid value of from 5 to 200 mgKOH/g (hereinafter sometimes referred to simply as a dispersing agent (c2) or component (c2)) in a proportion of from 11 to 40 parts by mass per 100 parts by mass of the infrared absorber (a).

The liquid composition according to a second embodiment of the present invention is an embodiment particularly preferred when the binder component (d) is composed mainly of the silicon oxide matrix material component. The types, the preferred embodiments, the contents and the like of the infrared absorber (a) and the ultraviolet absorber (b) in the liquid composition according to a second embodiment are all the same as those in the liquid composition according to a first embodiment. Further, optional components which can be used, including the chelating agent (e) are the same as the optional components in the liquid composition according to a first embodiment.

In the liquid composition according to a second embodiment of the present invention, the binder component (d) is also the same as the binder component (d) in the liquid composition according to a first embodiment, and particularly high effects of the present invention will be achieved when the binder component (d) composed mainly of the silicon oxide matrix material component is used.

The dispersing agent (c2) is, like the dispersing agent (c1) contained in the liquid composition according to a first embodiment, a component having two functions to secure the dispersion property of fine particles constituting the infrared absorber (a) in the liquid composition and to suppress a chelate bond of the ultraviolet absorber (b) to the infrared absorber (a) fine particles. The dispersing agent (c2) is the same as the dispersing agent (c1) except that it has an acid value of from 5 to 200 mgKOH/g. The acid value of the dispersing agent (c2) is more preferably from 10 to 95 mgKOH/g, particularly preferably from 15 to 80 mgKOH/g.

The amine value in the dispersing agent (c2) is preferably from 5 to 100 mgKOH/g, more preferably from 10 to 95 mgKOH/g, since the liquid composition according to a second embodiment is particularly preferred when the binder component (d) is composed mainly of the silicon oxide matrix material component.

The content of the dispersing agent (c2) in the liquid composition according to a second embodiment is from 11 to 40 parts by mass, and is preferably from 11 to 30 parts by mass, more preferably from 11 to 20 parts by mass per 100 parts by mass of the infrared absorber (a).

<Liquid Composition According to a Third Embodiment>

Now, the liquid composition according to a third embodiment of the present invention will be described except for points in common with the liquid composition according to a first embodiment of the present invention.

The liquid composition according to a third embodiment of the present invention is a liquid composition having the same composition as the liquid composition according to a first embodiment, except that the specifications for the type and the content of the dispersing agent are different from those of the liquid composition according to a first embodiment, and further, the chelating agent (e) which may be contained as an optional component in the liquid composition according to a first embodiment, is contained as an essential component.

That is, the liquid composition according to a third embodiment of the present invention comprises the same infrared absorber (a), ultraviolet absorber (b), binder component (d) and liquid medium (f) as those contained in the liquid composition according to a first embodiment, further contains a dispersing agent (c3) in a proportion of from 0.1 to 40 parts by mass per 100 parts by mass of the infrared absorber (a) and in such an amount that the product of the sum (mgKOH/g) of the acid value and the amine value of the dispersing agent (c3), and the mass ratio of the dispersing agent (c3) to the infrared absorber (a), is from 0 to 30 (mgKOH/g), and contains the same chelating agent (e) as that contained as an optional component in the liquid composition according to a first embodiment, in a proportion of from 2 to 50 parts by mass per 100 parts by mass of the infrared absorber (a).

With respect to the liquid composition according to a third embodiment of the present invention, two requirements that the dispersion property of fine particles constituting the infrared absorber (a) in the liquid composition is secured and that a chelate bond of the infrared absorber (b) to the infrared absorber (a) fine particles is suppressed, are satisfied by the interaction of the dispersing agent (c3) and the chelating agent (e) in combination, to the infrared absorber (a) fine particles.

As the dispersing agent (c3) to be used for the liquid composition according to a third embodiment, even a non-ionic dispersing agent having an acid value and an amine value being 0, that is, having no acidic group, basic group or functional group containing a salt thereof, may be used without any particularly restriction so long as it has affinity with the surface of the inorganic fine particles constituting the infrared absorber (a) by another mechanism, and it increases the dispersion property in the liquid composition. This is considered to be because the dispersing agent (c3) mainly functions to secure the dispersion property of the infrared absorber (a) fine particles. Accordingly, with a view to securing the dispersion property, the contents of the dispersing agent (c3) in the liquid composition is from 0.1 to 40 parts by mass, preferably from 0.5 to 30 parts by mass, more preferably from 1.0 to 20 parts by mass per 100 parts by mass of the infrared absorber (a).

The dispersing agent (c3) having an acid value and an amine value being 0, which may be used for the liquid composition according to a third embodiment, may, for example, be a polyethylene glycol type represented by ADEKA PEG series manufactured by Asahi Denka Co., Ltd.

Further, it is also possible to use a dispersing agent (c3) having an acid value or an amine value as the dispersing agent (c3), and in such a case, from the viewpoint of the dispersion stability, the liquid composition contains the dispersing agent (c3) in such an amount that the product of the sum (mgKOH/g) of the acid value and the amine value of the dispersing agent (c3), and the mass ratio of the dispersing agent (c3) to the infrared absorber (a), is at most 30 (mgKOH/g).

Specific examples of the dispersing agent (c3) having an acid value or an amine value, the same dispersing agents as described for the liquid composition according to a first embodiment may be mentioned.

Further, in the liquid composition according to a third embodiment, the chelating agent (e) is considered to have a function to suppress a chelate bond of the ultraviolet absorber (b) to the infrared absorber (a) fine particles, in the same manner as the liquid composition according to a first embodiment. In order to avoid inhibiting the dispersion stability while this function is sufficiently fulfilled, the liquid composition according to a third embodiment contains the chelating agent (e) in a proportion of from 2 to 50 parts by mass per 100 parts by mass of the infrared absorber (a). The content is preferably from 2.5 to 45 parts by mass, more preferably from 5 to 40 parts by mass per 100 parts by mass of the infrared absorber (a).

Specific examples and preferred embodiment of the chelating agent (e) are the same as those of the chelating agent (e) in the liquid composition according to a first embodiment.

Further, the types, the preferred embodiments, the content and the like of the infrared absorber (a), the ultraviolet absorber (b) and the binder component (d) in the liquid composition according to a third embodiment are all the same as those in the liquid composition according to a first embodiment. Further, optional components which may be used are the same as the optional components in the liquid composition according to a first embodiment except for the chelating agent (e).

[Process for Producing Liquid Composition of the Present Invention]

Now, the process for producing the liquid composition of the present invention will be described. The liquid compositions according to first to third embodiments are different in the type and the content of the dispersing agent and in whether the chelating agent (e) is an optional component or an essential component, but they can be produced basically by a process comprising the following steps (1) and (2).

Step (1): a dispersion preparation step of mixing the infrared absorber (a), any one of the dispersing agents (c1) to (c3) (hereinafter referred to as a dispersing agent (c)) and a dispersion medium to obtain a dispersion.

Step (2): a mixing step of mixing the dispersion obtained in the step (1), the ultraviolet absorber (b) and the binder component (d).

To produce the liquid composition according to a third embodiment, the chelating agent (e) is blended in the step (1) or (2), or a step (1') of mixing the dispersion obtained in the step (1) and the chelating agent (e) is provided between the steps (1) and (2). Preferably, the step (1') is provided to produce a liquid composition containing the chelating agent (e).

Further, in the liquid composition according to a first embodiment and the liquid composition according to a second embodiment, use of the chelating agent (e) is optional, and in the case of producing a liquid composition containing the chelating agent (e), the chelating agent (e) can be blended in the same manner as the case of producing the liquid composition according to a third embodiment.

(1) Dispersion Preparation Step (step (1))

In the case of producing the liquid composition according to a first embodiment of the present invention, the infrared absorber (a), the dispersing agent (c1) and a dispersion medium are mixed in this step (1). Of the infrared absorber (a) and the dispersing agent (c1), the types, the preferred embodiments and the like are as described for the liquid composition according to a first embodiment of the present invention.

Further, the blend ratio of the infrared absorber (a) and the dispersing agent (c1) used at the time of mixing is also such that the product of the sum (mgKOH/g) of the acid value and the amine value of the dispersing agent (c1), and the mass ratio of the dispersing agent (c1) to the infrared absorber (a), is from 2 to 30 (mgKOH/g), in the same manner as described for the liquid composition according to a first embodiment of the present invention. This value of the product is preferably from 2.5 to 25 (mgKOH/g), more preferably from 3 to 20 (mgKOH/g).

The dispersion medium to be used in the step (1) may be water and/or an organic solvent. The organic solvent here means a liquid medium comprising an organic compound and does not means the solvent which can dissolve the infrared absorber (a). The polymer chain of the dispersing agent (c1) is properly selected depending upon mainly the type of the binder component (d) and the type of the solvent selected in accordance with the binder component (d) to be used for the liquid composition according to a first embodiment of the present invention. The dispersion medium is also properly selected depending upon the types of the binder component (d) and the solvent. The dispersion medium is at least one compatible with the solvent selected in accordance with the type of the binder component (d), preferably the same as the solvent.

The organic solvent which may be used as the dispersion medium may, for example, be specifically an alcohol such as methanol, ethanol, n-propanol, isopropanol, n-butanol, ethylene glycol, diethylene glycol, triethylene glycol, propylene glycol or glycerin; an aromatic hydrocarbon such as toluene or xylene; a ketone such as acetone, methyl ethyl ketone or methyl isobutyl ketone; an ester such as methyl acetate, ethyl acetate, propyl acetate, butyl acetate or isobutyl acetate; an ether such as tetrahydrofuran, dioxane, ethylene glycol monomethyl ether (methyl cellosolve), ethylene glycol monoethyl ether (ethyl cellosolve) or ethylene glycol monobutyl ether (butyl cellosolve), an aliphatic hydrocarbon such as hexane, or an alicyclic hydrocarbon such as cyclohexane.

The amount of the dispersion medium to be used is preferably from 10 to 10,000 parts by mass, more preferably from 50 to 5,000 parts by mass, particularly preferably from 100 to 500 parts by mass per 100 parts by mass of the infrared absorber (a).

To produce the liquid composition according to a second embodiment of the present invention, the infrared absorber (a), the dispersing agent (c2) and the dispersion medium are mixed in this step (1). Of the infrared absorber (a) and the dispersing agent (c2), the type, the preferred embodiment and the like are as described for the liquid composition according to a second embodiment of the present invention.

Further, the blend ratio of the dispersing agent (c2) to the infrared absorber (a) to be used at the time of mixing is also such that the proportion of the dispersing agent (c2) is from 11 to 40 parts by mass per 100 parts by mass of the infrared absorber (a), in the same manner as described for the liquid composition according to a second embodiment of the present invention. The blend ratio is preferably such that the proportion of the dispersing agent (c2) is from 11 to 30 parts by mass, more preferably from 11 to 20 parts by mass per 100 parts by mass of the infrared absorber (a).

In the case of producing the liquid composition according to a second embodiment of the present invention, the dispersion medium used in the step (1) is the same as the dispersion medium used in the step (1) in the case of producing the liquid composition according to a first embodiment. However, in the liquid composition according to a second embodiment of the present invention, preferably the binder component (d) containing the silicon oxide matrix material component as the main component is used, and accordingly the dispersion medium is preferably methanol, ethanol, 1-propanol, 2-propanol or the like, which is compatible with water/alcohol. The amount to be used is the same as in the case of producing the liquid composition according to a first embodiment.

In the case of producing the liquid composition according to a third embodiment of the present invention, the infrared absorber (a), the dispersing agent (c3), the chelating agent (e) in a case where it is mixed together in this stage, and the dispersion medium are mixed in this step (1). Of the infrared absorber (a), the dispersing agent (c3) and the chelating agent (e), the type, the preferred embodiment and the like are as described for the liquid composition according to a third embodiment.

Further, the blend ratio of the dispersing agent (c3) to the infrared absorber (a) to be used at the time of mixing is also a proportion of from 0.1 to 40 parts by mass per 100 parts by mass of the infrared absorber (a) and in such a ratio that the product of the sum (mgKOH/g) of the acid value and the amine value of the dispersing agent (c3), and the mass ratio of the dispersing agent (c3) to the infrared absorber (a), is from 0 to 30 (mgKOH/g). The blend ratio is preferably such that the amount of the dispersing agent (c3) is from 0.5 to 30 parts by mass per 100 parts by mass of the infrared absorber (a) and that the above product is from 1.0 to 20 (mgKOH/g).

In a case where the chelating agent (e) is blended in this step (1), the blend amount is such that the amount of the chelating agent (e) is from 2 to 50 parts by mass, preferably from 2.5 to 45 parts by mass, more preferably from 5 to 40 parts by mass per 100 parts by mass of the infrared absorber (a).

In the case of producing the liquid composition according to a third embodiment of the present invention, the type and the amount of use of the dispersion medium to be used in the step (1) are the same as the type and the amount of use of the dispersion medium used in the step (1) in the case of producing the liquid composition according to a first embodiment.

As a method of preparing a dispersion from the above respective components in the step (1), a known mixing and stirring method may be employed. For example, predetermined amounts of the predetermined components are weighed, and they are mixed and stirred by a bead mill, a ball mill or a nanomizer.

(1') Chelating Agent (e) Mixing Step

In the case of producing the liquid composition according to a third embodiment of the present invention, the chelating agent (e) may be added as one component of the dispersion in the step (1), however, it is preferred that a dispersion comprising the infrared absorber (a), the dispersing agent (c3) and the dispersion medium is prepared in the step (1)

and then the chelating agent (e) is added to and mixed with the dispersion obtained in the step (1) in a step (1'). The addition amount of the chelating agent (e) is as mentioned above, and the mixing method is not particularly limited so long as uniform mixing can be carried out. Specifically, a mixing method e.g. by a magnetic stirrer may be mentioned.

Also in a case where the chelating agent (e) is blended as an optional component in production of the liquid composition according to a first embodiment and the liquid composition according to a second embodiment of the present invention, the chelating agent (e) may be blended in the same manner as in the case of producing the liquid composition according to a third embodiment.

(2) Mixing Step

To the dispersion obtained in the step (1) or (1'), the ultraviolet absorber (b), the binder component (d), the solvent and other components in predetermined amounts are mixed. This mixing step (2) is a step carried out in production of the liquid compositions according to first to third embodiments of the present invention in common. Components blended to the dispersion are all the components of the liquid composition other than the components contained in the dispersion. Of such components, the type and the blend amount are as described above. The mixing method is not particularly limited so long as uniform mixing can be carried out. Specifically, a mixing method by e.g. a magnetic stirrer may be mentioned.

In such a manner, the liquid composition for forming a coating film of the present invention is obtained. The liquid composition for forming a coating film of the present invention is used by being applied to the surface of a substrate on which a coating film is to be formed, to form a film. The material of the substrate to which the liquid composition for forming a coating film of the present invention is applied is not particularly limited, and basically a transparent glass, resin or the like may be mentioned.

In a case where the substrate is made of glass, the material, may, for example, be usual soda lime glass, borosilicate glass, alkali-free glass, quartz glass or the like. As the glass substrate, a glass substrate which absorbs ultraviolet rays or infrared rays may also be used. Further, in a case where the substrate is made of a resin, the material may, for example, be an acrylic resin such as polymethyl methacrylate or an aromatic polycarbonate resin such as polyphenylene carbonate.

In the present invention, among them, preferred is a glass substrate from the viewpoint of the weather resistance of the substrate and the adhesion to the substrate. Now, a glass article comprising a glass substrate and a coating film formed by using the liquid composition of the present invention on the glass substrate will be described.

[Glass Article of the Present Invention]

The glass article of the present invention comprises a glass substrate, and a coating film formed by using the liquid composition according to any one of the first to third embodiments of the present invention on at least part of the surface of the glass substrate.

A specific method of forming a coating film by using the liquid composition according to any one of the first to third embodiments of the present invention on a glass substrate to obtain the glass article of the present invention may be a process comprising (A) a step of applying the liquid composition to a glass substrate to form a wet coating film and (B) a step of removing the liquid medium (f) from the obtained wet coating film, and further carrying out a treatment depending upon the coating film formation conditions of the binder component (d) used, for example, a curing treatment in the case of a curable resin, to form a coating film.

In this specification, a film comprising the liquid composition of the present invention containing the liquid medium (f) applied to the substrate will be referred to as "a wet coating film", and a film in a state where the liquid medium (f) is removed from the wet coating film and film formation is completed by carrying out a treatment depending upon the binder component (d) to be used, for example, curing, will be referred to as "a coating film".

First, in the step (A), the liquid composition is applied to a glass substrate to form a wet coating film of the liquid composition. The wet coating film formed here is a wet coating film containing the liquid medium (f). The method of applying the liquid composition to the glass substrate is not particularly limited so long as the liquid composition is uniformly applied, and a known method such as a flow coating method, a dip coating method, a spin coating method, a spray coating method, a flexographic printing method, a screen printing method, a gravure printing method, a roll coating method, a meniscus coating method or a die coating method may be employed. The thickness of the wet coating film formed by the coating liquid is determined considering the thickness of the coating film finally obtainable.

The subsequent step (B) is carried out by properly selecting conditions depending upon the binder component (d) to be used.

For example, in the case of the binder component (d) containing the silicon oxide matrix material component as the main component to be preferably used in the present invention, in the step (B), the liquid medium (f) is removed from the wet coating film of the liquid composition on the glass substrate and at the same time, the silicon oxide matrix material component such as the hydrolyzable silicon compound is cured to form a coating film. Now, the step (B) will be described in the case of a liquid composition using the binder component (d) containing the silicon oxide matrix material component as the main component, as the liquid composition of the present invention.

In this case, removal of the liquid medium (f) from the wet coating film in the step (B) is carried out preferably by heating and/or vacuum drying. After the wet coating film is formed on the glass substrate, it is preferred to carry out temporary drying at a temperature at a level of from room temperature to 120° C., with a view to improving the leveling property of the wet coating film. Usually, the liquid medium (f) is volatilized and removed in parallel with this operation of temporary drying, and accordingly the operation of removal of the liquid medium is included in the temporary drying. The time for the temporary drying, i.e. the time for the operation of removal of the liquid medium, depends on the liquid composition to be used for forming a coating film and is preferably from about 3 seconds to about 2 hours.

On that occasion, the liquid medium (f) is preferably sufficiently removed, but may not completely be removed. That is, part of the liquid medium (f) may remain on the coating film within a range not to impair the performance of the coating film finally obtainable. Further, in the case of carrying out heating for removal of the liquid medium (f), subsequent heating for preparation of the silicon oxide compound carried out as the case requires, and heating for removal of the liquid medium (f), i.e. generally temporary drying, may be carried out continuously.

After the liquid medium (f) is removed from the wet coating film as mentioned above, the silicon oxide matrix material component such as the hydrolyzable silicon compound is cured. This reaction may be carried out at room temperature or under heating. In a case where a cured product (silicon oxide matrix) is to be formed under heating, since the cured product contains organic components, the upper limit of the heating temperature is preferably 200° C., particularly preferably 190° C. Since the cured product may be formed even at room temperature, the lower limit of the heating temperature is not particularly limited. However, in a case where promotion of the reaction by heating is intended, the lower limited of the heating temperature is preferably 60° C., more preferably 80° C. Accordingly, the heating temperature is preferably from 60 to 200° C., more preferably from 80 to 190° C. The heating time depends on the composition of the liquid composition to be used for forming a coating film, and is preferably from several minutes to several hours.

The method of forming a coating film on a glass substrate has been described above with reference to a case of the liquid composition using the binder component (d) containing the silicon oxide matrix material component as the main component as the liquid composition of the present invention. However, even in a case where another curable resin, thermoplastic resin or the like is used as the binder component (d), a coating film can be formed by a known method to be used for forming a coating film on a glass substrate using such a resin.

The coating film to be formed by using the liquid composition of the present invention as mentioned above has excellent infrared-absorbing property and ultraviolet-absorbing property, is securely colorless and transparent, and is further excellent in the weather resistance. In the glass article of the present invention having the above coating film, the thickness of the coating film is preferably from 1.0 to 7.0 μm, more preferably from 1.5 to 5.5 μm. If the thickness of the coating film is less than 1.0 μm, the ultraviolet-absorbing or infrared-absorbing effects may be insufficient. Further, if the thickness of the coating film exceeds 7.0 μm, cracking may occur.

Of the glass article of the present invention having the above coating film, specifically, the ultraviolet transmittance measured by a spectrophotometer (U-4100 manufactured by Hitachi, Ltd.) is preferably at most 3.0%, more preferably at most 1.0%, particularly preferably at most 0.5%, as the ultraviolet transmittance measured in accordance with ISO-9050 (1990).

Further, the solar transmittance is preferably at most 45.0%, more preferably at most 44.0%, particularly preferably at most 43.0% as the solar transmittance measured in accordance with JIS R3106 (1998).

Further, the visible light transmittance is preferably at least 50%, more preferably at least 70%, particularly preferably at least 74% as the visible light transmittance measured in accordance with JIS R3212 (1998).

As mentioned above, the glass article having a coating film formed by using the liquid composition of the present invention has excellent infrared-absorbing property and ultraviolet-absorbing property, is securely colorless and transparence, and is further excellent in the weather resistance, and is thereby applicable to a glass article for outdoor use, for example, window glass for a vehicle such as an automobile, or window glass for a building material to be attached to a house or building.

EXAMPLES

Now, the present invention will be described in further detail with reference to Examples. However, it should be understood that the present invention is by no means restricted to such specific Examples. The following Examples 1 to 10 are Examples of the present invention, and Examples 11 and 12 are Comparative Examples.

<Details About Commercially Available Products (Tradenames) used in Examples>

SR-SEP: manufactured by SAKAMOTO YAKUHIN KOGYO CO., LTD., sorbitol polyglycidyl ether SOLMIX AP-1: manufactured by Japan Alcohol Trading CO., LTD., a mixed solvent of ethanol:2-propanol:methanol=85.5:13.4:1.1 (mass ratio)

ITO ultrafine particles: manufactured by Mitsubishi Materials Corporation (average primary particles size: 20 nm)

CHELEST GA: manufactured by CHELEST CORPORATION, dihydroxyethylglycine (aminocarboxylic acid chelating agent)

CHELEST PH210: manufactured by CHELEST CORPORATION, 1-hydroxyethylidene-1,1-diphosphonic acid solution (phosphonic acid chelating agent)

CHELEST MZ-8: manufactured by CHELEST CORPORATION, aminocarboxylate (aminocarboxylic acid chelating agent)

Properties of DISPERBYK are as identified in Table 1.

TINUVIN 477-DW: manufactured by BASF, water-dispersion type hydroxyphenyltriazine ultraviolet absorber TINUVIN 99-DW: manufactured by BASF, water-dispersion type hydroxyphenylbenzotriazole ultraviolet absorber <Example for Preparation of Silylated Ultraviolet Absorber Solution>

49.2 g of 2,2',4,4'-tetrahydroxybenzophenone (manufactured by BASF), 123.2 g of 3-glycidoxypropyltrimethoxysilane (manufactured by Shin-Etsu Chemical Co., Ltd.), 0.8 g of benzyltriethylammonium chloride (manufactured by JUNSEI CHEMICAL CO., LTD.) and 100 g of butyl acetate (manufactured by JUNSEI CHEMICAL CO., LTD.) were charged, heated to 60° C. with stirring and dissolved, and heated to 120° C. and subjected to reaction for 4 hours, thereby to obtain a silylated ultraviolet absorber solution having a solid content concentration of 63 mass %.

<Example for Preparation of ITO Dispersion A>

11.9 g of ITO ultrafine particles, 3.9 g of DISPERBYK-194 and 24.2 g of SOLMIX AP-1 were subjected to a dispersion treatment using a ball mill for 48 hours, and SOLMIX AP-1 was further added to dilute the mixture to an ITO solid content concentration of 20 mass % thereby to obtain ITO dispersion A.

<Example for Preparation of ITO Dispersion B>

11.9 g of ITO ultrafine particles, 1.0 g of DISPERBYK-102 and 24.2 g of SOLMIX AP-1 were subjected to a dispersion treatment using a ball mill for 48 hours, and SOLMIX AP-1 was further added to dilute the mixture to an ITO solid content concentration of 20 mass % thereby to obtain ITO dispersion B.

<Example for Preparation of ITO Dispersion C>

11.9 g of ITO ultrafine particles, 0.4 g of DISPERBYK-180 and 24.2 g of SOLMIX AP-1 were subjected to a dispersion treatment using a ball mill for 48 hours, and SOLMIX AP-1 was further added to dilute the mixture to an ITO solid content concentration of 20 mass % thereby to obtain ITO dispersion C.

<Example for Preparation of ITO Dispersion D>

11.9 g of ITO ultrafine particles, 9.0 g of DISPERBYK-190 and 24.2 g of SOLMIX AP-1 were subjected to a dispersion treatment using a ball mill for 48 hours, and SOLMIX AP-1 was further added to dilute the mixture to an ITO solid content concentration of 20 mass % thereby to obtain ITO dispersion D.

<Example for Preparation of ITO Dispersion E>

11.9 g of ITO ultrafine particles, 7.9 g of DISPERBYK-194 and 24.2 g of SOLMIX AP-1 were subjected to a dispersion treatment using a ball mill for 48 hours, and SOLMIX AP-1 was further added to dilute the mixture to an ITO solid content concentration of 20 mass % thereby to obtain ITO dispersion E.

<Example for Preparation of ITO Dispersion F>

11.9 g of ITO ultrafine particles, 3.0 g of DISPERBYK-190 and 24.2 g of SOLMIX AP-1 were subjected to a dispersion treatment using a ball mill for 48 hours, and SOLMIX AP-1 was further added to dilute the mixture to an ITO solid content concentration of 20 mass % thereby to obtain ITO dispersion F.

<Example for Preparation of ITO Dispersion G>

11.9 g of ITO ultrafine particles, 0.9 g of DISPERBYK-191 and 24.2 g of SOLMIX AP-1 were subjected to a dispersion treatment using a ball mill for 48 hours, and SOLMIX AP-1 was further added to dilute the mixture to an ITO solid content concentration of 20 mass % thereby to obtain ITO dispersion G.

The compositions of the obtained dispersions A to G are shown in Table 2.

<Example for Preparation of SR-SEP Solution>

SR-SEP was diluted with SOLMIX AP-1 to obtain a SR-SEP solution having a solid content concentration of 30 mass %.

Example 1

9.3 g of ITO dispersion A, 33.8 g of SOLMIX AP-1, 11.7 g of tetramethoxysilane, 10.4 g of silylated ultraviolet absorber solution, 3.1 g of SR-SEP solution, 20.7 g of pure water and 11.0 g of acetic acid were charged and stirred for one hour to obtain liquid composition 1. The composition of the obtained liquid composition 1 is shown in Table 3. Then, the liquid composition 1 was applied by a spin coating method on a high heat-absorbing green glass having its surface cleaned (Tv: 74.8%, Tuv: 9.5%, Te: 48.0%, transmittance of light with a wavelength of 380 nm: 38.5%, 10 cm in length, 10 cm in width, 3.5 cm in thickness, tradename: UVFL, manufactured by Asahi Glass Company, Limited) and dried in atmospheric air at 180° C. for 30 minutes, to obtain an ultraviolet/infrared-absorbing film-attached glass plate.

Further, the liquid composition 1 was stored in a constant temperature chamber at 25° C. for 3 days, and then an ultraviolet/infrared-absorbing film-attached glass plate was obtained in the same manner. The properties of the obtained ultraviolet-absorbing film-attached glass plate were evaluated as follows. The evaluation results are shown in Table 4.
[Evaluations]
1) Film thickness: film thickness [nm] of the ultraviolet/infrared-absorbing film was measured by using a stylus surface profiler (ULVAC, Dektak150).
2) Spectral properties: measured by a spectrophotometer (U-4100 manufactured by Hitachi, Ltd.), to calculate the visible light transmittance (Tv [%]) in accordance with JIS-R3212 (1998), the ultraviolet transmittance (Tuv [%]) in accordance with ISO-9050 (1990) and the solar radiation transmittance (Te [%]) in accordance with JIS R3106 (1998), and to calculate YI in accordance with JIS-K7105 (1981).
3) Abrasion resistance: using a Taber abrasion resistance test machine, in accordance with JIS R3212 (1998), an abrasion test of 1,000 rotations with a CS-10F abrasive wheel was carried out, whereby the haze values before and after the test were measured to obtain an increase (%) of the haze value.
4) Accelerated weathering test (evaluation of light resistance): the film thickness was adjusted so that the initial Tuv became 1.0. Specifically, since the ultraviolet/infrared-absorbing film obtained in Example 1 has a thickness of 3.9 μm and Tuv of 0.3%, the film thickness with which Tuv becomes 1.0 is 1.9 μm. Thus, the liquid composition 1 was formed into a film so that the film thickness became 1.9 μm to obtain an ultraviolet/infrared-absorbing film-attached glass plate.

In a super xenon weather meter (manufactured by Suga Test Instruments Co., Ltd., SX75) having conditions set to an illumination intensity of 150 W/m$^2$ (300 to 400 nm), a black panel temperature of 83° C. and a humidity of 50 RH %, the ultraviolet/infrared-absorbing film-attached glass plate was set and left to stand for 1,000 hours to carry out an accelerated weathering test. After the test, the spectral properties were measured to obtain the difference in Tuv (%) between before and after the test as ΔTuv [%].

Example 2

Liquid composition 2 was prepared in the same manner as in Example 1 except that ITO fine particle dispersion B was used instead of ITO fine particle dispersion A, and an ultraviolet/infrared-absorbing film-attached glass plate was prepared in the same manner as in Example 1. The properties of the obtained ultraviolet/infrared-absorbing film-attached glass plate were evaluated in the same manner as in Example 1. The composition of the obtained liquid composition 2 is shown in Table 3, and the evaluation results are shown in Table 4.

Example 3

Liquid composition 3 was prepared in the same manner as in Example 1 except that ITO fine particle dispersion C was used instead of ITO fine particle dispersion A, and an ultraviolet/infrared-absorbing film-attached glass plate was prepared in the same manner as in Example 1. The properties of the obtained ultraviolet/infrared-absorbing film-attached glass plate were evaluated in the same manner as in Example 1. The composition of the obtained liquid composition 3 is shown in Table 3, and the evaluation results are shown in Table 4.

Example 4

Liquid composition 4 was prepared in the same manner as in Example 1 except that ITO fine particle dispersion D was used instead of ITO fine particle dispersion A and that its addition amount was 3 times, and an ultraviolet/infrared-absorbing film-attached glass plate was prepared in the same manner as in Example 1. The properties of the obtained ultraviolet/infrared-absorbing film-attached glass plate were evaluated in the same manner as in Example 1. The composition of the obtained liquid composition 4 is shown in Table 3, and the evaluation results are shown in Table 4.

Example 5

Liquid composition 5 was prepared in the same manner as in Example 1 except that ITO fine particle dispersion E was used instead of ITO fine particle dispersion A, and an ultraviolet/infrared-absorbing film-attached glass plate was prepared in the same manner as in Example 1. The properties of the obtained ultraviolet/infrared-absorbing film-attached glass plate were evaluated in the same manner as in Example 1. The composition of the obtained liquid composition 5 is shown in Table 3, and the evaluation results are shown in Table 4.

Example 6

9.3 g of ITO fine particle dispersion F and 7.4 g of CHELEST GA aqueous solution (solid content concentration: 10 mass %) were charged and stirred for 10 minutes, and 33.0 g of SOLMIX AP-1, 11.7 g of tetramethoxysilane, 10.4 g of silylated ultraviolet absorber solution, 3.1 g of SR-SEP solution, 14.1 g of pure water and 11.0 g of acetic acid were charged and stirred for one hour to obtain liquid composition 6. The composition of the obtained liquid composition 6 is shown in Table 3.

Then, liquid composition 2 was applied by a spin coating method on a high heat-absorbing green glass having its surface cleaned (Tv: 75.2%, Tuv: 9.5%, transmittance of light with a wavelength of 380 nm: 38.5%, 10 cm in length, 10 cm in width, 3.5 cm in thickness, tradename: UVFL, manufactured by Asahi Glass Company, Limited) and dried in atmospheric air at 180° C. for 30 minutes, to obtain an ultraviolet/infrared-absorbing film-attached glass plate.

Further, liquid composition 2 was stored in a constant temperature chamber at 25° C. for 3 days, and then an ultraviolet/infrared-absorbing film-attached glass plate was obtained in the same manner. The properties of the obtained ultraviolet/infrared-absorbing film-attached glass plate were evaluated in the same manner as in Example 1. The evaluation results are shown in Table 4.

Example 7

9.3 g of ITO fine particle dispersion A and 0.15 g of CHELEST PH210 were charged and stirred for 10 minutes, and 36.2 g of AP-1, 10.7 g of tetramethoxysilane, 10.5 g of silylated ultraviolet absorber solution, 4.2 g of SR-SEP solution, 18.9 g of pure water and 10.1 g of acetic acid were charged and stirred for one hour to obtain liquid composition 7. The composition of the obtained liquid composition 7 is shown in Table 3.

Then, liquid composition 3 was applied by a spin coating method on a high heat-absorbing green glass having its surface cleaned (Tv: 75.2%, Tuv: 9.5%, transmittance of light with a wavelength of 380 nm: 38.5%, 10 cm in length, 10 cm in width, 3.5 cm in thickness, tradename: UVFL, manufactured by Asahi Glass Company, Limited) and dried in atmospheric air at 180° C. for 30 minutes, to obtain an ultraviolet/infrared-absorbing film-attached glass plate.

Further, liquid composition 3 was stored in a constant temperature chamber at 25° C. for 3 days, and then an ultraviolet/infrared-absorbing film-attached glass plate was obtained in the same manner. The properties of the obtained ultraviolet/infrared-absorbing film-attached glass plate were evaluated in the same manner as in Example 1. The evaluation results are shown in Table 4.

Example 8

9.3 g of ITO fine particle dispersion A and 1.2 g of CHELEST MZ-8 were charged and stirred for 10 minutes, and 33.0 g of AP-1, 11.7 g of tetramethoxysilane, 10.4 g of silylated ultraviolet absorber solution, 3.1 g of SR-SEP solution, 20.2 g of pure water and 11.0 g of acetic acid were charged and stirred for one hour to obtain liquid composition 8. The composition of the obtained liquid composition 8 is shown in Table 3.

Then, liquid composition 4 was applied by a spin coating method on a high heat-absorbing green glass having its surface cleaned (Tv: 75.2%, Tuv: 9.5%, transmittance of light with a wavelength of 380 nm: 38.5%, 10 cm in length, 10 cm in width, 3.5 cm in thickness, tradename: UVFL, manufactured by Asahi Glass Company, Limited) and dried in atmospheric air at 180° C. for 30 minutes, to obtain an ultraviolet/infrared-absorbing film-attached glass plate.

Further, liquid composition 4 was stored in a constant temperature chamber at 25° C. for 3 days, and then an ultraviolet/infrared-absorbing film-attached glass plate was obtained in the same manner. The properties of the obtained ultraviolet/infrared-absorbing film-attached glass plate were evaluated in the same manner as in Example 1. The evaluation results are shown in Table 4.

Example 9

10.2 g of ITO dispersion A, 23.4 g of SOLMIX AP-1, 12.7 g of tetramethoxysilane, 5.11 g of 3-glycidoxypropyltrimethoxysilane, 10.8 g of TINUVIN-477DW, 3.3 g of SR-SEP solution, 22.5 g of pure water and 12.0 g of acetic acid were charged and stirred for one hour to prepare liquid composition 9, and an ultraviolet/infrared-absorbing film-attached glass plate was prepared in the same manner as in Example 1. The properties of the obtained ultraviolet/infrared-absorbing film-attached glass plate were evaluated in the same manner as in Example 1. The composition of the obtained liquid composition 9 is shown in Table 3, and the evaluation results are shown in Table 4.

Example 10

9.5 g of ITO dispersion A, 27.0 g of SOLMIX AP-1, 12.7 g of tetramethoxysilane, 5.11 g of 3-glycidoxypropyltrimethoxysilane, 12.0 g of TINUVIN-99DW, 3.3 g of SR-SEP solution, 22.5 g of pure water and 12.0 g of acetic acid were charged and stirred for one hour to prepare liquid composition 10, and an ultraviolet/infrared-absorbing film-attached glass plate was prepared in the same manner as in Example 1. The properties of the obtained ultraviolet/infrared-absorbing film-attached glass plate were evaluated in the same manner as in Example 1. The composition of the obtained liquid composition 10 is shown in Table 3, and the evaluation results are shown in Table 4.

Example 11

Liquid composition 11 was prepared in the same manner as in Example 1 except that ITO fine particle dispersion F was used instead of ITO fine particle dispersion A, and an ultraviolet/infrared-absorbing film-attached glass plate was prepared in the same manner as in Example 1. The properties of the obtained ultraviolet/infrared-absorbing film-attached glass plate were evaluated in the same manner as in Example 1. The composition of the obtained liquid composition 11 is shown in Table 3, and the evaluation results are shown in Table 4.

Example 12

Liquid composition 10 was prepared in the same manner as in Example 1 except that ITO fine particle dispersion G was used instead of ITO fine particle dispersion A, and an ultraviolet/infrared-absorbing film-attached glass plate was prepared in the same manner as in Example 1. The properties of the obtained ultraviolet/infrared-absorbing film-attached glass plate were evaluated in the same manner as in Example 1. The composition of the obtained liquid composition 12 is shown in Table 3, and the evaluation results are shown in Table 4.

TABLE 2

| C | | A | B | C | D | E | F | G |
|---|---|---|---|---|---|---|---|---|
| Infrared absorber (a) | Type | ITO | ITO | ITO | ITO | ITO | ITO | ITO |
| | Addition amount (g) (X) | 11.9 | 11.9 | 11.9 | 11.9 | 11.9 | 11.9 | 11.9 |
| Dispersing agent (c) | Type | DISPERBYK-194 | DISPERBYK-102 | DISPERBYK-180 | DISPERBYK-190 | DISPERBYK-194 | DISPERBYK-190 | DISPERBYK-191 |
| | Addition amount (g) (Y) | 3.9 | 1.0 | 0.4 | 9.0 | 7.9 | 3.0 | 0.9 |
| | Non-volatile content | 53.0% | 90.0% | 79.0% | 40.0% | 53.0% | 40.0% | 40.0% |
| | Mass ratio to ITO (R = Y/X) | 17.0% | 8.0% | 3.0% | 30.0% | 35.0% | 10.0% | 3.0% |
| | Acid value (G) | 70 | 100 | 95 | 10 | 70 | 10 | 30 |
| | Amine value (H) | — | — | 95 | — | — | — | 20 |
| | Acid value + amine value (S = G + H) | 70 | 100 | 190 | 10 | 70 | 10 | 50 |
| | Product (R × S) | 11.9 | 8.0 | 5.7 | 3.0 | 24.5 | 1.0 | 1.5 |

TABLE 3

| | | Ex. 1 | Ex. 2 | Ex. 3 | Ex. 4 | Ex. 5 | Ex. 6 |
|---|---|---|---|---|---|---|---|
| Liquid composition | | 1 | 2 | 3 | 4 | 5 | 6 |
| ITO dispersion | | A | B | C | D | E | A |
| Infrared absorber (a) | Amount (parts by mass) per 100 parts by mass of binder component (d) | 11.0 | 11.0 | 11.0 | 11.0 | 11.0 | 11.0 |
| Ultraviolet absorber (b) | Type | Benzophenone type | Benzophenone type | Benzophenone type | Benzophenone type | Benzophenone type | Benzophenone type |
| | Amount (parts by mass) per 100 parts by mass of binder component (d) | 11.0 | 11.0 | 11.0 | 11.0 | 11.0 | 11.0 |
| Dispersing agent (c) | Amount (parts by mass) per 100 parts by mass of infrared absorber (a) | 17.4 | 7.6 | 2.7 | 30.3 | 35.2 | 17.4 |
| Chelating agent (e) | Type | — | — | — | — | — | Aminocarboxylic acid type |
| | Amount (parts by mass) per 100 parts by mass of infrared absorber (a) | — | — | — | — | — | 38.4 |

| | | Ex. 7 | Ex. 8 | Ex. 9 | Ex. 10 | Ex. 11 | Ex. 12 |
|---|---|---|---|---|---|---|---|
| Liquid composition | | 7 | 8 | 9 | 10 | 11 | 12 |
| ITO dispersion | | A | A | A | A | F | G |
| Infrared absorber (a) | Amount (parts by mass) per 100 parts by mass of binder component (d) | 11.4 | 11.0 | 10.1 | 10.1 | 13.8 | 13.8 |
| Ultraviolet absorber (b) | Type | Benzophenone type | Benzophenone type | Triazine type | Benzotriazole type | Benzophenone type | Benzophenone type |
| | Amount (parts by mass) per 100 parts by mass of binder component (d) | 11.4 | 11.0 | 11.7 | 10.1 | 13.8 | 13.8 |
| Dispersing agent (c) | Amount (parts by mass) per 100 parts by mass of infrared absorber (a) | 17.4 | 17.4 | 17.4 | 17.4 | 10.1 | 3.0 |
| Chelating agent (e) | Type | Phosphonic acid type | Aminocarboxylic acid type | — | — | — | — |
| | Amount (parts by mass) per 100 parts by mass of infrared absorber (a) | 7.9 | 38.9 | — | — | — | — |

TABLE 4

|  |  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|---|
| Film produced immediately after preparation | Initial properties | Thickness [μm] | 3.9 | 40 | 4.1 | 4.0 | 4.1 | 4.0 | 4.0 | 3.9 | 4.0 | 4.0 | 4.0 | 4.0 |
|  |  | Tv [%] | 74.0 | 73.8 | 74.0 | 74.1 | 73.9 | 74.0 | 73.9 | 74.1 | 74.0 | 74.0 | 74.0 | 74.0 |
|  |  | Tuv [%] | 0.3 | 0.3 | 0.3 | 0.3 | 0.3 | 0.3 | 0.3 | 0.3 | 0.7 | 0.5 | 0.3 | 0.3 |
|  |  | Te [%] | 42.2 | 42.1 | 42.0 | 42.1 | 42.0 | 42.1 | 42.0 | 42.1 | 42.1 | 42.0 | 42.0 | 42.1 |
|  |  | YI | 4.9 | 4.9 | 4.9 | 4.9 | 4.9 | 3.7 | 3.1 | 4.4 | 5.0 | 3.9 | 5.5 | 5.3 |
|  | Abrasion resistance test | Increase of haze [%] | 2.0 | 1.8 | 2.1 | 2.2 | 1.9 | 2.3 | 2.5 | 1.7 | 2.3 | 2.4 | 2.4 | 2.2 |
|  | Weather resistance test | Thickness [μm] | 1.9 | 2.0 | 1.9 | 1.8 | 2.0 | 1.9 | 1.8 | 2.0 | 1.8 | 1.7 | 1.8 | 1.9 |
|  |  | ΔTuv [%] | 3.8 | 3.7 | 3.6 | 3.7 | 3.1 | 2.5 | 2.5 | 3.1 | 3.5 | 3.7 | 4.9 | 4.7 |
| Film produced after storage | Initial properties | Thickness [μm] | 3.9 | 4.0 | 4.1 | 4.0 | 4.1 | 4.0 | 4.0 | 3.9 | 4.0 | 4.0 | 4.0 | 4.0 |
|  |  | Tv [%] | 74.0 | 73.8 | 74.0 | 74.1 | 73.9 | 74.0 | 73.9 | 74.1 | 74.0 | 74.0 | 74.0 | 74.0 |
|  |  | Tuv [%] | 0.3 | 0.3 | 0.3 | 0.3 | 0.3 | 0.3 | 0.3 | 0.3 | 0.6 | 0.4 | 0.3 | 0.3 |
|  |  | YI | 5.6 | 5.5 | 5.6 | 5.8 | 4.9 | 4.3 | 3.3 | 4.6 | 5.7 | 5.8 | 7.7 | 6.5 |
|  | Abrasion resistance test | Increase of haze [%] | 1.9 | 1.9 | 2.3 | 2.0 | 2.2 | 2.1 | 2.4 | 2.0 | 2.3 | 2.4 | 2.4 | 2.2 |
|  | Weather resistance test | Thickness [μm] | 1.9 | 2.0 | 1.9 | 1.8 | 2.0 | 1.9 | 1.8 | 2.0 | 1.8 | 1.7 | 1.8 | 1.9 |
|  |  | ΔTuv [%] | 4.3 | 4.0 | 4.0 | 4.6 | 3.1 | 2.7 | 2.5 | 3.2 | 4.0 | 4.3 | 5.1 | 5.0 |

As evident from Table 4, a glass article having a coating film formed by using each of liquid compositions in Examples 1 to 8 which are liquid compositions of the present invention, has excellent infrared-absorbing property and ultraviolet-absorbing property, is securely colorless and transparent, and is further excellent in the weather resistance.

INDUSTRIAL APPLICABILITY

A glass article having a coating film formed by using the liquid composition of the present invention, has excellent infrared-absorbing property and ultraviolet-absorbing property, is securely colorless and transparent, and is further excellent in the weather resistance, and is thereby applicable to a glass article for outdoor use, such as window glass for a vehicle such as an automobile, or window glass for a building material to be attached to a house or building.

This application is a continuation of PCT Application No. PCT/JP2012/057393, filed on Mar. 22, 2012, which is based upon and claims the benefit of priority from Japanese Patent Application No. 2011-066745 filed on Mar. 24, 2011. The contents of those applications are incorporated herein by reference in its entirety.

What is claimed is:

1. A liquid composition for forming a coating film, comprising:
   (a) an infrared absorber comprising at least one member selected from indium tin oxide, antimony tin oxide and a composite tungsten oxide;
   (b) an ultraviolet absorber comprising at least one member selected from a benzophenone compound, a triazine compound and a benzotriazole compound;
   (c) a dispersing agent;
   (d) a binder component;
   (e) a chelating agent capable of forming a complex with the infrared absorber (a), the complex not substantially absorbing light having a visible light wavelength; and
   (f) a liquid medium.

2. The liquid composition according to claim 1, wherein at least one of the conditions (I) to (III) is satisfied:
   (I) the dispersing agent (c) has an acid value and/or an amine value; and the dispersing agent (c) is contained in the liquid composition in such an amount that the product of the sum (mgKOH/g) of the acid value and the amine value, and the mass ratio of the dispersing agent (c) to the infrared absorber (a), is from 2 to 30 (mgKOH/g);
   (II) the dispersing agent (c) has an acid value of from 5 to 200 mgKOH/g; and the dispersing agent is contained in the liquid composition in a proportion of from 11 to 40 parts by mass per 100 parts by mass of the infrared absorber (a); or
   (III) the dispersing agent (c) has an acid value and/or an amine value; the dispersing agent (c) is contained in the liquid composition in a proportion of from 0.1 to 40 parts by mass per 100 parts by mass of the infrared absorber (a) and in such an amount that the product of the sum (mgKOH/g) of the acid value and the amine value, and the mass ratio of the dispersing agent (c) to the infrared absorber (a), is from 0 to 30 (mgKOH/g); and the chelating agent (e) is contained in the liquid composition in a proportion of from 2 to 50 parts by mass per 100 parts by mass of the infrared absorber (a).

3. The liquid composition according to claim 2, wherein when the condition (I) is satisfied, one of the following conditions is satisfied:
   the dispersing agent (c) has the acid value of from 40 to 200 mgKOH/g and the amine value of from 0 to 10 mgKOH/g,
   the dispersing agent (c) has the acid value of from 0 to 10 mgKOH/g and the amine value of from 40 to 200 mgKOH/g, or
   the dispersing agent (c) has the acid value of from 5 to 30 mgKOH/g and the amine value of from 5 to 30 mgKOH/g.

4. The liquid composition according to claim 2, wherein when one of the conditions (I) and (II) is satisfied, the chelating agent (e) is contained in the liquid composition in a proportion of from 2 to 50 parts by mass per 100 parts by mass of the infrared absorber (a).

5. The liquid composition according to claim 1, wherein the chelating agent (e) is at least one member selected from the group consisting of an aminocarboxylic acid chelating agent, a phosphonic acid chelating agent and a chelate metal salt.

6. The liquid composition according to claim 1, wherein the infrared absorber (a) is contained in the liquid composition in a proportion of from 1 to 80 parts by mass, and the ultraviolet absorber (b) is contained in the liquid composition in a proportion of from 1 to 50 parts by mass, per 100 parts by mass of the binder component (d).

7. The liquid composition according to claim 1, wherein the ultraviolet absorber (b) is a hydroxy group-containing benzophenone compound.

8. The liquid composition according to claim 1, wherein the ultraviolet absorber (b) is an ultraviolet absorber having a silyl group having a hydrolyzable group bonded.

9. The liquid composition according to claim 1, wherein the infrared absorber (a) is indium tin oxide.

10. The liquid composition according to claim 1, wherein the binder component (d) comprises a silicon oxide matrix material component.

11. The liquid composition according to claim 10, wherein the binder component (d) further comprises a polyepoxide.

12. A glass article comprising:
a glass substrate; and
a coating film formed from the liquid composition as defined in claim 1 on at least part of a surface of the glass substrate.

13. The glass article according to claim 12, wherein the thickness of the coating film is from 1.0 to 7.0 µm.

14. A process for producing a liquid composition for forming a coating film, comprising:
mixing an infrared absorber (a) comprising at least one member selected from indium tin oxide, antimony tin oxide and a composite tungsten oxide, a dispersing agent (c) having an acid value and/or an amine value, and a dispersion medium to obtain a dispersion;
mixing a chelating agent (e) capable of forming a complex with the infrared absorber (a), the complex not substantially absorbing light having a visible light wavelength, with the dispersion; and
mixing the dispersion, in which the chelating agent is mixed, an ultraviolet absorber (b) comprising at least one member selected from a benzophenone compound, a triazine compound and a benzotriazole compound, and a binder component (d).

15. The process according to claim 14, wherein at least one of the following conditions (I) to (III) is satisfied:
(I) the content of the dispersing agent (c) in the dispersion is adjusted so that the product of the sum (mgKOH/g) of the acid value and the amine value of the dispersing agent (c), and the mass ratio of the dispersing agent (c) to the infrared absorber (a), is from 2 to 30 (mgKOH/g);
(II) the dispersing agent (c) has the acid value of from 5 to 200 mgKOH/g, and the content of the dispersing agent (c) in the dispersion is adjusted to from 11 to 40 parts by mass per 100 parts by mass of the infrared absorber (a); or
(III) the content of the dispersing agent (c) in the dispersion is adjusted to from 0.1 to 40 parts by mass per 100 parts by mass of the infrared absorber (a) and so that the product of the sum (mgKOH/g) of the acid value and the amine value, and the mass ratio of the dispersing agent (c) to the infrared absorber (a), is from 0 to 30 (mgKOH/g); and the content of the chelating agent (e) in the dispersion is adjusted to from 2 to 50 parts by mass per 100 parts by mass of the infrared absorber (a).

16. The process according to claim 15,
wherein when the condition (I) is satisfied, one of the following conditions is satisfied:
the dispersing agent (c) has the acid value of from 40 to 200 mgKOH/g and the amine value of from 0 to 10 mgKOH/g,
the dispersing agent (c) has the acid value of from 0 to 10 mgKOH/g and the amine value of from 40 to 200 mgKOH/g, or
the dispersing agent (c) has the acid value of from 5 to 30 mgKOH/g and the amine value of from 5 to 30 mgKOH/g.

17. The process according to claim 15, wherein when one of the conditions (I) and (II) is satisfied, the content of the chelating agent (e) in the dispersion is adjusted to from 2 to 50 parts by mass per 100 parts by mass of the infrared absorber (a).

18. The liquid composition according to claim 1, wherein the infrared absorber (a) is contained in the liquid composition in a proportion of from 5 to 60 parts by mass, and the ultraviolet absorber (b) is contained in the liquid composition in a proportion of from 5 to 40 parts by mass, per 100 parts by mass of the binder component (d).

19. The liquid composition according to claim 1, wherein the infrared absorber (a) is contained in the liquid composition in a proportion of from 10 to 40 parts by mass, and the ultraviolet absorber (b) is contained in the liquid composition in a proportion of from 8 to 30 parts by mass, per 100 parts by mass of the binder component (d).

20. The liquid composition according to claim 1, wherein the chelating agent (e) is contained in the liquid composition in a proportion of from 2 to 50 parts by mass per 100 parts by mass of the infrared absorber (a).

* * * * *